(12) United States Patent
Sneed et al.

(10) Patent No.: US 10,436,894 B2
(45) Date of Patent: *Oct. 8, 2019

(54) SYSTEMS AND METHODS FOR HAIL ACTIVITY DISPLAY

(71) Applicant: Dynamic Weather Solutions, Inc, Plano, TX (US)

(72) Inventors: Daron D. Sneed, Plano, TX (US); Michael J. Weissbluth, Steamboat Springs, CO (US)

(*) Notice: Subject to any disclaimer, the term of this patent is extended or adjusted under 35 U.S.C. 154(b) by 341 days.

This patent is subject to a terminal disclaimer.

(21) Appl. No.: 15/593,368

(22) Filed: May 12, 2017

(65) Prior Publication Data

US 2017/0276785 A1   Sep. 28, 2017

Related U.S. Application Data

(63) Continuation-in-part of application No. 14/071,414, filed on Nov. 4, 2013, now Pat. No. 9,678,206.

(60) Provisional application No. 61/729,274, filed on Nov. 21, 2012.

(51) Int. Cl.
| | |
|---|---|
| *G01S 13/87* | (2006.01) |
| *G01S 13/58* | (2006.01) |
| *G01S 13/95* | (2006.01) |
| *G06F 17/10* | (2006.01) |
| *G01S 7/00* | (2006.01) |
| *G01S 7/22* | (2006.01) |

(52) U.S. Cl.
CPC .............. *G01S 13/87* (2013.01); *G01S 7/003* (2013.01); *G01S 7/22* (2013.01); *G01S 13/58* (2013.01); *G01S 13/95* (2013.01); *G01S 13/951* (2013.01); *G01S 13/958* (2013.01); *G06F 17/10* (2013.01); *Y02A 90/18* (2018.01)

(58) Field of Classification Search
None
See application file for complete search history.

(56) References Cited

U.S. PATENT DOCUMENTS

| | | | | |
|---|---|---|---|---|
| 5,764,518 A | * | 6/1998 | Collins | B25J 9/1617 700/95 |
| 6,456,226 B1 | * | 9/2002 | Zheng | G01S 7/003 342/26 R |
| 7,558,674 B1 | * | 7/2009 | Neilley | G01W 1/02 702/3 |
| 9,810,770 B1 | * | 11/2017 | Weichbrod | G01S 13/953 |
| 10,302,815 B1 | * | 5/2019 | Kronfeld | G01W 1/00 |
| 2007/0156339 A1 | * | 7/2007 | Oettinger | G01R 29/0842 702/4 |
| 2007/0162328 A1 | * | 7/2007 | Reich | G06Q 30/02 705/14.58 |

(Continued)

OTHER PUBLICATIONS

Kiel L. Ortega in Evaluating Multi-Radar, Multi-Sensor Products for Surface Hail-Fall Diagnosis, published on Feb. 18, 2018, pp. 1-36.*

*Primary Examiner* — Tung S Lau
(74) *Attorney, Agent, or Firm* — John Lindsay

(57) ABSTRACT

The present invention is directed to system and method of processing meteorological data. The system receives meteorological data corresponding to a geographic region for a storm event. A hail data indicator pair comprising a first hail data indicator and a second hail data indicator is selected, with hail data indicators being meteorological data which directly or indirectly indicates hail activity.

20 Claims, 25 Drawing Sheets

(56) References Cited

U.S. PATENT DOCUMENTS

2015/0309208 A1* 10/2015 Sneed .................. G01W 1/10
702/3

* cited by examiner

| Timestamp | Latitude | Longitude | Particle Size | Number of Particles | Height of Particles | Probability of Severe Hail |
|---|---|---|---|---|---|---|
| 1 | lat1 | long1 | size1 | numpart1 | height1 | posh1 |
| 1 | lat2 | long2 | size | numpart | height | posh |
| 2 | lat1 | long1 | size | numpart | height | posh |
| 2 | lat3 | long3 | size | numpart | height | posh |
| 3 | lat1 | long1 | size | numpart | height | posh |
| 3 | lat4 | long4 | size | numpart | height | posh |
| 4 | lat1 | long1 | size | numpart | height | posh |
| 4 | lat5 | long5 | size | numpart | height | posh |
| 5 | lat1 | long1 | size | numpart | height | posh |
| 5 | lat6 | long6 | size | numpart | height | posh |
| 6 | lat1 | long1 | size | numpart | height | posh |
| 6 | lat7 | long7 | size | numpart | height | posh |
| ... | latx | longx | sizex | numpartx | heightx | poshx |

Fig. 4

Hail Data Factor 1 Ranges

|  | I1 R1 | I1 R2 | I1 R3 | I1 R4 | I1 R5 | I1 R6 | I1 R7 | I1 R8 | I1 R9 | I1 R10 |
|---|---|---|---|---|---|---|---|---|---|---|
| I2 R1 | O1 | | | | | | | | | |
| I2 R2 | O2 | | | | | | | | | |
| I2 R3 | O3 | | | | | | | | | |
| I2 R4 | O4 | | | | | | | | | |
| I2 R5 | O5 | | | | | | | | | |
| I2 R6 | O6 | | | | | | | | | |
| I2 R... | On | | | | | | | | | |

Fig. 10A

Probability of Severe Hail

| Vertically Integrated Liquid Density (number of occurrences) | 0 – 10% | 11 – 20% | 21 – 30% | 31 – 40% | 41 – 50% | 51 – 60% | 61 – 70% | 71 – 80% | 81 – 90% | 91 – 100% |
|---|---|---|---|---|---|---|---|---|---|---|
| 0 – 1.14 | 1845 | 18 | 5 | 5 | 2 | 0 | 2 | 0 | 0 | 0 |
| 1.15 – 2.29 | 626 | 52 | 49 | 38 | 17 | 7 | 6 | 2 | 1 | 0 |
| 2.3 – 3.44 | 152 | 50 | 66 | 57 | 33 | 30 | 18 | 11 | 2 | 1 |
| 3.45 – 4.59 | 21 | 16 | 23 | 23 | 29 | 33 | 21 | 9 | 7 | 0 |
| 4.6 – 5.74 | 13 | 2 | 8 | 8 | 15 | 16 | 20 | 10 | 11 | 11 |
| > 5.75 | 12 | 0 | 0 | 2 | 2 | 7 | 12 | 19 | 11 | 12 |

Fig. 10B

Hail Data Factor 1 Ranges

| | I1 R1 | I1 R2 | I1 R3 | I1 R4 | I1 R5 | I1 R6 | I1 R7 | I1 R8 | I1 R9 | I1 R10 |
|---|---|---|---|---|---|---|---|---|---|---|
| I2 R1 | D1 | | | | | | | | | |
| I2 R2 | D2 | | | | | | | | | |
| I2 R3 | D3 | | | | | | | | | |
| I2 R4 | D4 | | | | | | | | | |
| I2 R5 | D5 | | | | | | | | | |
| I2 R6 | D6 | | | | | | | | | |
| I2 R... | Dn | | | | | | | | | |

Hail Data Factor 2 Ranges

Fig. 11A

Probability of Severe Hail (POSH)

| Vertically Integrated Liquid Density (VILD) | 0 – 10% | 11 – 20% | 21 – 30% | 31 – 40% | 41 – 50% | 51 – 60% | 61 – 70% | 71 – 80% | 81 – 90% | 91 – 100% |
|---|---|---|---|---|---|---|---|---|---|---|
| 0 – 1.14 | 0.69127 | 0.130435 | 0.033113 | 0.037594 | 0.020408 | 0 | 0.025316 | 0 | 0 | 0 |
| 1.15 – 2.29 | 0.234545 | 0.376812 | 0.324503 | 0.285714 | 0.173469 | 0.075269 | 0.075949 | 0.039216 | 0.03125 | 0 |
| 2.3 – 3.44 | 0.05695 | 0.362319 | 0.437086 | 0.428571 | 0.336735 | 0.322581 | 0.227848 | 0.215686 | 0.0625 | 0.041667 |
| 3.45 – 4.59 | 0.007868 | 0.115942 | 0.152318 | 0.172932 | 0.295918 | 0.354839 | 0.265823 | 0.176471 | 0.21875 | 0 |
| 4.6 – 5.74 | 0.004871 | 0.014493 | 0.05298 | 0.06015 | 0.153061 | 0.172043 | 0.253165 | 0.196078 | 0.34375 | 0.458333 |
| > 5.75 | 0.004496 | 0 | 0 | 0.015038 | 0.020408 | 0.075269 | 0.151899 | 0.372549 | 0.34375 | 0.5 |

Fig. 11B

Hail Data Factor 1 Ranges

| | F1 R1 | F1 R2 | F1 R3 | F1 R4 | F1 R5 | F1 R6 | F1 R7 | F1 R8 | F1 R9 | F1 R10 | Hail Intensity Display Number |
|---|---|---|---|---|---|---|---|---|---|---|---|
| Hail Data Factor 2 Ranges | F2 R1 P1 * RV1 | P2 * RV2 | P3 * RV3 | P4 * RV4 | P5 * RV5 | P6 * RV6 | P7 * RV7 | P8 * RV8 | P9 * RV9 | P10 * RV10 | Σ |
| | F2 R2 | | | | | | | | | | |
| | F2 R3 | | | | | | | | | | |
| | F2 R4 | | | | | | | | | | |
| | F2 R5 | | | | | | | | | | |
| | F2 R6 | | | | | | | | | | |
| | F2 R... | | | | | | | | | | |

Fig. 12A

Probability of Severe Hail (POSH)

| | 0 – 10% | 11 – 20% | 21 – 30% | 31 – 40% | 41 – 50% | 51 – 60% | 61 – 70% | 71 – 80% | 81 – 90% | 91 – 100% | Hail Intensity Display Number |
|---|---|---|---|---|---|---|---|---|---|---|---|
| Vertically Integrated Liquid Density (VILD) 0 – 1.14 | 0.69127 | 0.130435 | 0.033113 | 0.037594 | 0.020408 | 0 | 0.025316 | 0 | 0 | 0 | 14.81107 |
| 1.15 – 2.29 | 0.234545 | 0.376812 | 0.324503 | 0.285714 | 0.173469 | 0.075949 | 0.039216 | 0.03125 | 0 | 55.50114 |
| 2.3 – 3.44 | 0.05695 | 0.362319 | 0.437086 | 0.428571 | 0.336735 | 0.322581 | 0.227848 | 0.215686 | 0.0625 | 0.041667 | 117.25885 |
| 3.45 – 4.59 | 0.007868 | 0.115942 | 0.152318 | 0.172932 | 0.295918 | 0.354839 | 0.265823 | 0.176471 | 0.21875 | 0 | 102.38337 |
| 4.6 – 5.74 | 0.004871 | 0.014493 | 0.05298 | 0.06015 | 0.153061 | 0.172043 | 0.253165 | 0.196078 | 0.34375 | 0.458333 | 132.48819 |
| > 5.75 | 0.004496 | 0 | 0 | 0.015038 | 0.020408 | 0.075269 | 0.151899 | 0.372549 | 0.34375 | 0.5 | 127.55737 |

Fig. 12B

| Hail Data Factor 2 Ranges | Hail Intensity Display Number |
|---|---|
| F2 R1 | |
| F2 R2 | |
| F2 R3 | |
| F2 R4 | |
| F2 R5 | |
| F2 R6 | |
| F2 R... | |

Fig. 13A

| Vertically Integrated Liquid Density (VILD) | Hail Intensity Display Number |
|---|---|
| 0 – 1.14 | 14.81107 |
| 1.15 – 2.29 | 55.50114 |
| 2.3 – 3.44 | 117.25885 |
| 3.45 – 4.59 | 102.38337 |
| 4.6 – 5.74 | 132.48819 |
| > 5.75 | 127.55737 |

SYSTEMS AND METHODS FOR HAIL ACTIVITY DISPLAY

PRIORITY

The present invention claims priority to nonprovisional application Ser. No. 14/071,414, which has a filing date of Nov. 4, 2013, which claims priority to provisional application 61/729,274, which has a filing date of Nov. 21, 2012.

BACKGROUND

Field of the Invention

The present invention relates to meteorological data processing and display systems, and more specifically to systems and methods of calculating and displaying localized hail activity.

Description of the Related Art

There is currently a lack of precision in automated processing and reporting of the intensity of a hail storm. That is to say that the size, density, and duration of hail at a particular location is not readily available and in a format for consumption in order to take meaningful action in response to the hail data. Limited processing and reporting is available for one of the options but not all three. For example, current reporting may readily show "quarter size hail," but fail to readily include the duration of that hail size during the hail event or only indicate that hail of that size occurred in a broad region of a metropolis.

This lack of precision in hail storm data has business-wide adverse impact. For example, in the insurance industry, insurance adjusters must investigate and prove or disprove claims after a hail storm. Due to the nature of a hail storm, a large number of reports for investigation are received afterward in a short period of time. Time can be of the essence in investigating such claims due to the liability of the insurance company. As more time passes between the hail storm and the insurance investigation, the more difficult it is to establish the hail storm as the cause of damages to property. Currently an adjuster's primary option is to visit the insured sites without being able to prioritize the insured sites by probability of meaningful damage, resulting in inefficient use of limited time.

Again, the deficiency in processing of historical meteorological data for intensity of hail storms in a readily used format is shown in the insurance industry. The fundamental approach of insurance is to spread risk across the pool of the insured. Additionally, the decision to underwrite and the premiums assessed are adjusted based on the potentially insured party. Currently, the lack of precision in hail storm data processing and reporting limits the ability use the historical data to focus on prior hail storm events for a localized area and thus make meaningful underwriting decisions.

For the above reasons, it would be advantageous to have a system and methods of processing and displaying hail event data in a readily perceptible format.

SUMMARY

The present invention is directed to system and method of processing meteorological data. The system receives meteorological data corresponding to a geographic region for a storm event. A hail data indicator pair comprising a first hail data indicator and a second hail data indicator is selected, with hail data indicators being meteorological data which directly or indirectly indicates hail activity.

A storm event distribution is generated using the hail data indicator pair comprising the steps of configuring ranges for each of the hail data indicators, tabulating the number of occurrences of data points from the storm event data within the intersecting ranges of the first hail data indicator and the second hail data indicator, and calculating the proportion of occurrences within the intersecting ranges.

A hail intensity number display matrix is calculated for each of the second hail data indicator ranges using the storm event distribution comprising the steps of generating a summation of the proportional occurrences of the second hail data indicator over the first hail data indicator ranges, yielding a hail intensity number display for the respective range.

The instantaneous second hail data indicator value from the meteorological data of the corresponding time period and geographic location is retrieved, and the hail intensity display number from the hail intensity number display matrix using the instantaneous second hail data indicator value is further retrieved. A data packet of the hail intensity display numbers, each of the hail intensity display numbers corresponding to a local geographic point is generated.

These and other features, aspects, and advantages of the invention will become better understood with reference to the following description, and accompanying drawings.

BRIEF DESCRIPTION OF THE DRAWINGS

FIG. 4 depicts a representative partial database schema for input into the process and system of FIG. 1;

FIGS. 10A and 10B depict distributions of data in given hail data indicator pairs;

FIGS. 11A and 11B depict distributions of data in given hail data indicator pairs;

FIGS. 12A and 12B depict distributions of data in given hail data indicator pairs, segmented in ranges, along with hail intensity display numbers;

FIGS. 13A and 13B depict hail intensity display numbers in given hail data indicator pairs;

DETAILED DESCRIPTION

Detailed descriptions of the preferred embodiment are provided herein. It is to be understood, however, that the present invention may be embodied in various forms. Therefore, specific details disclosed herein are not to be interpreted as limiting, but rather as a basis for the claims and as a representative basis for teaching one skilled in the art to employ the present invention in virtually any appropriately detailed system, structure or manner.

Figure 1:
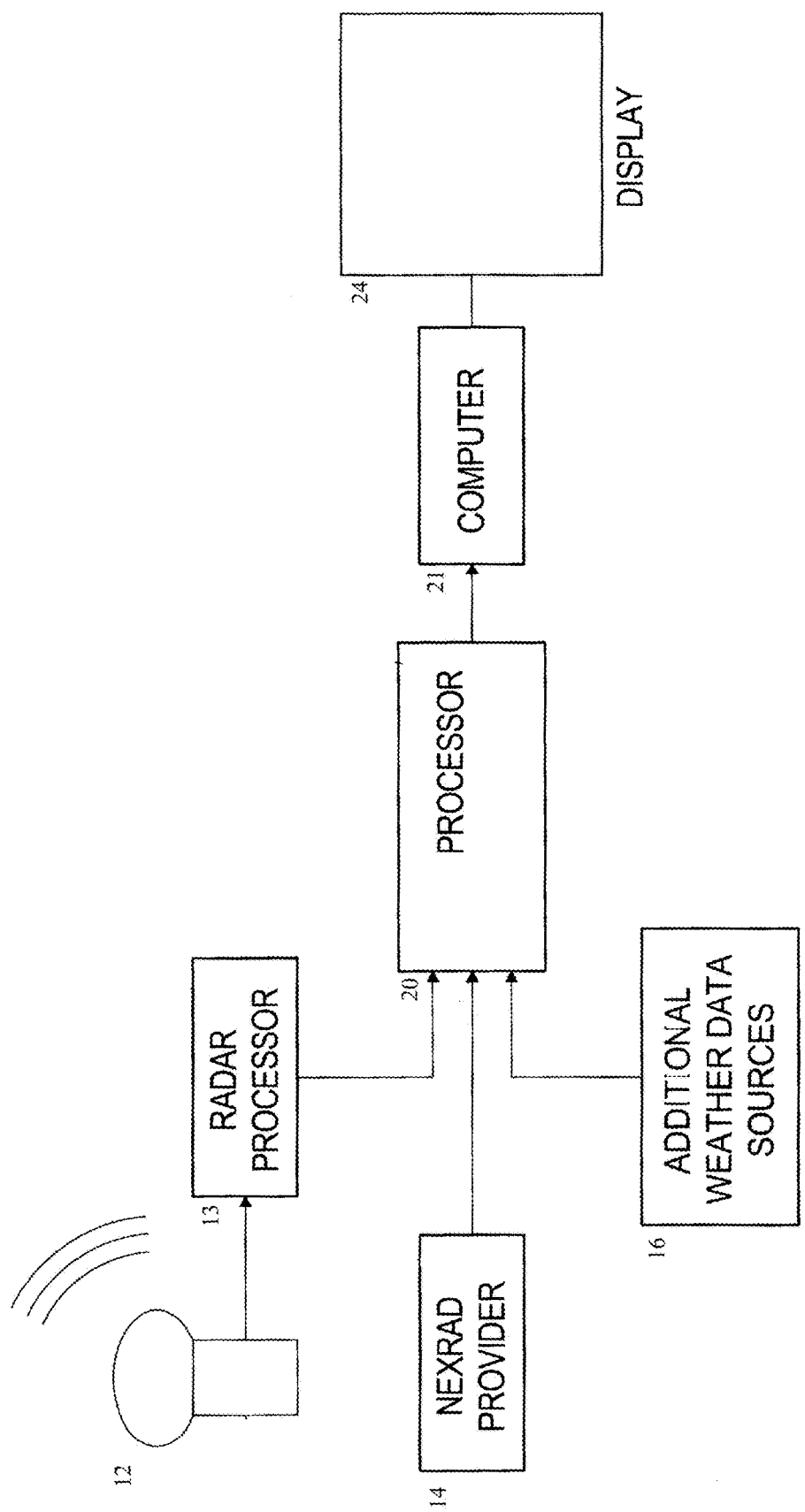
FIG. 1 depicts an embodiment of a system according to the current invention.

The present invention is directed to a system and process for inferring probable hail size, density, and duration for a selected area and presenting a graphical representation of the same. Referring to FIG. 1, the major components of an embodiment of the system 10 is presented. Meteorological data sources 12 13 14 16, a processor 20 of a computer 21, and a display 24 are illustrated. Doppler radar 12 coupled to a radar processor 13 as one source of meteorological data is shown. NEXRAD 14, as a second source of meteorological data is shown. Additional data sources 16, such as alternate online providers, may exist as another source of meteorological data is shown. A computer 21 having a processor 20 compiles, processes, and stores meteorological data. The processor 20 outputs data packets for transmission and presentation on a display 24.

A computer 21 as referred to in this specification generally refers to a system which includes a central processing unit (CPU), memory, a screen, a network interface, and input/output (I/O) components connected by way of a data bus. The I/O components may include for example, a mouse, keyboard, buttons, or a touchscreen. The network interface enables data communications with the computer network. A server is a computer 21 containing various server software programs and preferably contains application server software. A minicomputer is a computer 21 such as a smartphone or tablet PC with smaller dimensions, such as iPhone, iPod Touch, iPad, Blackberry, or Android based device. Those skilled in the art will appreciate that computer 21 may take a variety of configurations, including personal computers, hand-held devices, multi-processor systems, microprocessor-based electronics, network PCs, minicomputers, mainframe computers, and the like. Additionally, the computer 21 may be part of a distributed computer environment where tasks are performed by local and remote processing devices that are linked. Although shown as separate devices, one skilled in the art can understand that the structure of and functionality associated with the aforementioned elements can be optionally partially or completely incorporated within one or the other, such as within one or more processors. As noted above, the processes of this invention, or subsets thereof, may exist in on one or more computers such as a client/server approach. The process, or subsets thereof, may exist in a machine-readable medium. The machine-readable medium may include, but is not limited to, floppy diskettes, optical disks, CD-ROMs, and magneto-optical disks, ROMs, RAMs, EPROMs, EEPROMs, magnetic or optical cards, propagation media or other type of media/machine-readable medium suitable for storing electronic instructions. For example, the present invention may be downloaded as a computer program or "app" which may be transferred from a remote computer to a requesting computer by way of data signals embodied in a carrier wave or other propagation medium via a communication link.

Figure 2:
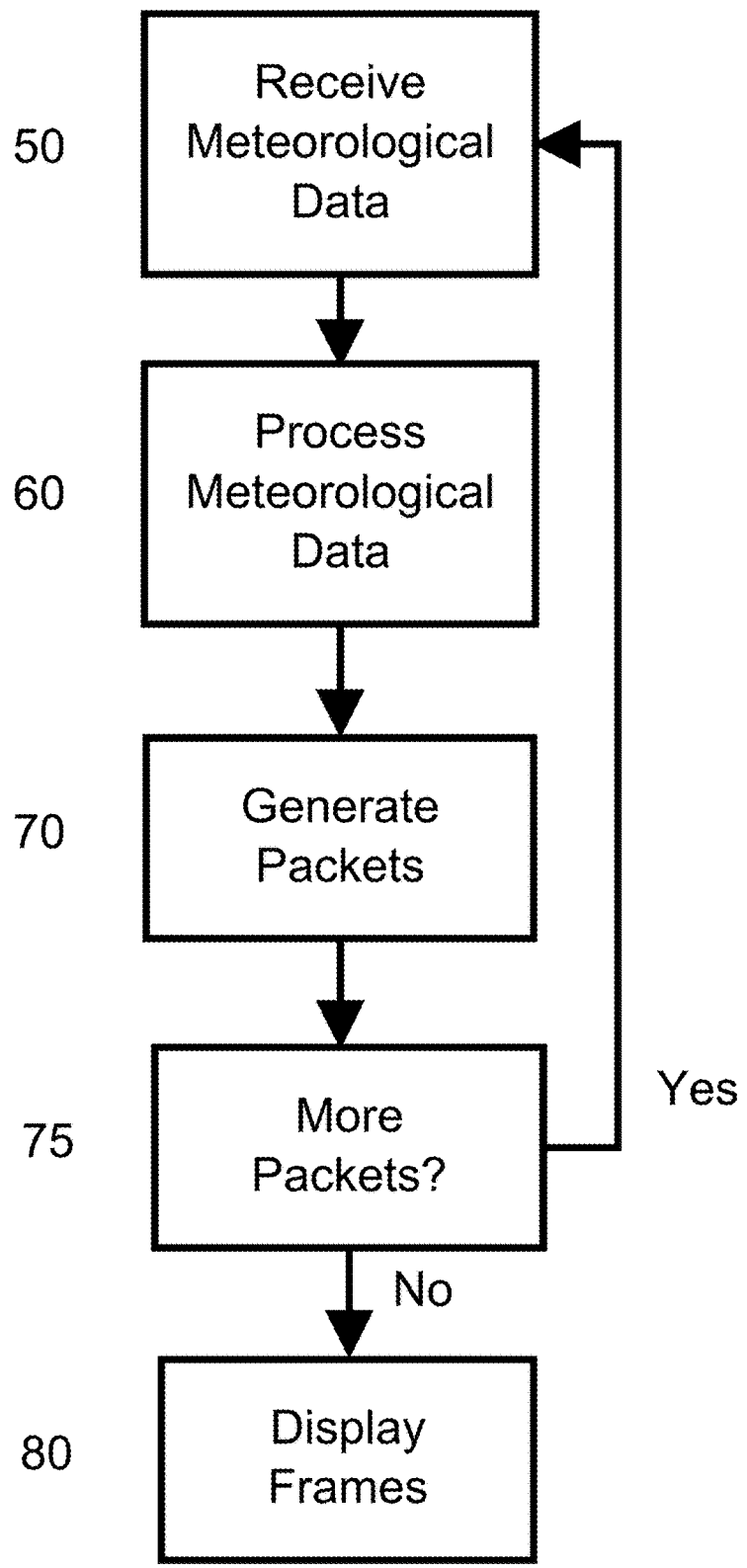
FIG. 2 depicts a flowchart of the major steps of a process implemented to an embodiment of a system according to the current invention.

Referring to FIG. 2, the system 10 receives meteorological data for a selected geographical area for a selected time frame 50. The system 10 processes and transforms the received meteorological data 60. The system 10 then generates a series of data packets representing map data and hail intensity overlay data in the form of a derived hail intensity index representing visual data frames 70. The exemplary system 10 displays the data packets as a sequence of overlaid visual frames 80 for ready perception of the probable hail size, density, and duration for the selected geographical area and selected time period.

Figure 3:
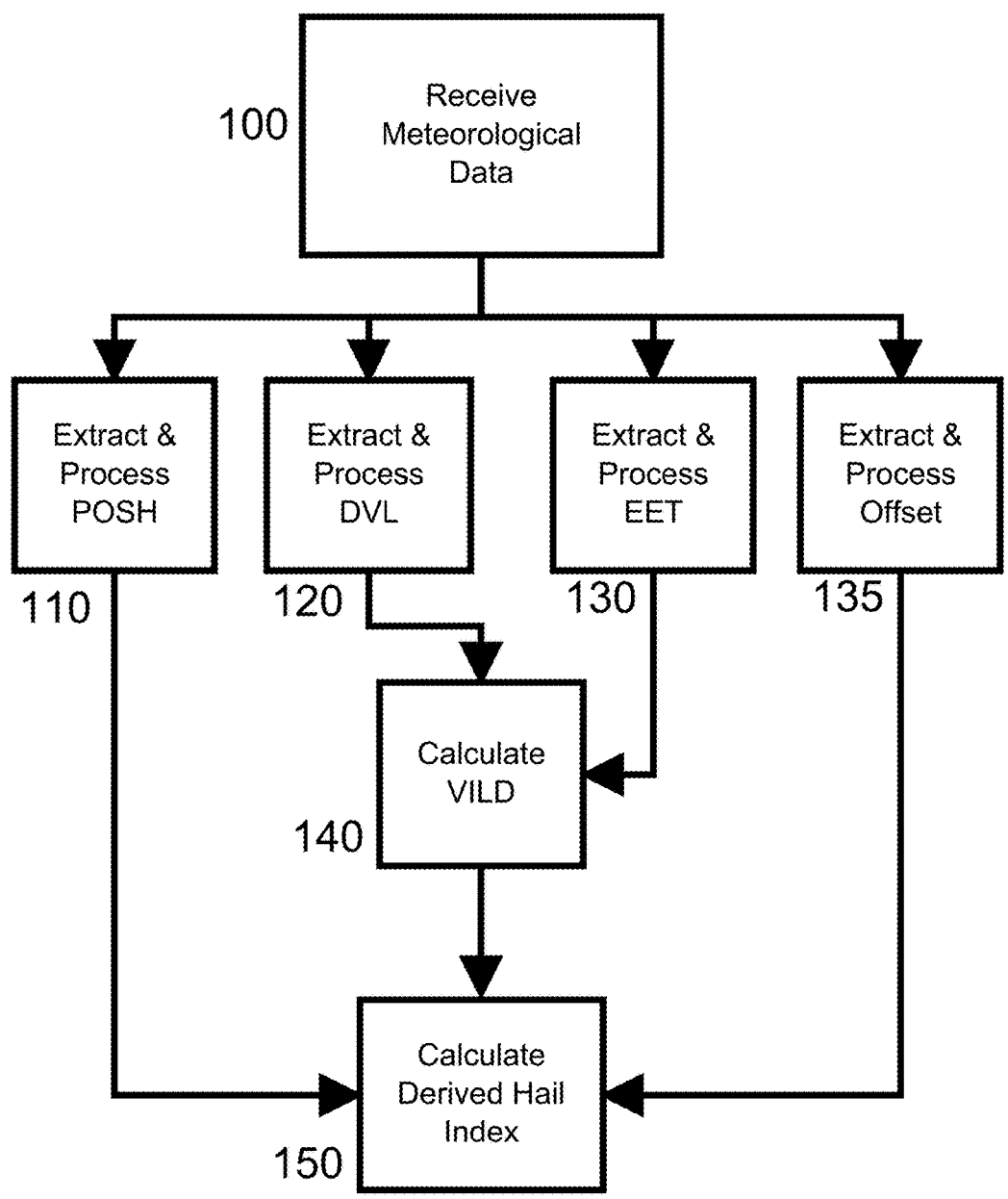
FIG. 3 depicts a flowchart of a subset of the process of FIG. 1.

Now referring to FIG. 3, a more detailed disclosure of the above embodied process is shown. The system 10 receives meteorological data 100. In one configuration, doppler radar units are C-band or X-band Doppler meteorological surveillance radar with automatic computer processing systems. The system may further include S-band to supplement. These radar units provide measurement of both reflectivity and velocity of liquid and can scan volumetrically to produce detailed data. In a reflectivity mode, the liquid echoes are scaled to correspond directly to values of liquid content. In velocity mode, the radar measures the movement of scattering particles along the radar beam. In one configuration, meteorological data including precipitation, cloud cover data, the bottom and top of cloud formations, and reflectivity and velocity of liquid are acquired from C-band Doppler radar, which is combined with NEXRAD data, and the data is digitized and stored for real-time, near real-time, or historical processing. The full volumetric data of the storm enables the system to "slice" a storm to view cross sections from various angles, and from various vantage points. The meteorological data sources 12 13 14 16, directly or indirectly, and without exclusion, can include data products such as rainfall intensity, reflectivity, composite reflectivity, clear air mode, precipitation mode, echo tops, vertical integrated liquid, surface rainfall accumulation, radial velocity, velocity azimuth display winds, winds aloft, wind shear, microburst activity, and the like.

FIG. 4 shows a representative partial database schema for input to the current embodiment of the system 10. It includes series of rows or "slices" having a timestamp for a particular set of data, a latitude and latitude, water particle size, number of water particles, the height of those water particles, and the probability of severe hail ("POSH"). It is to be understood that the input meteorological data can be pre-processed prior to input to the system 10 or post-processed for use by the system 10. For example, as the basis of the data in this configuration is received from radar incident or at an angle relative to the atmosphere being sampled, latitude and longitudinal data for the ground position of the sampled air column is computed as known in the art. For example, water particle size may represent an average of an array of water particles within the particular data set. In an exemplary configuration, the meteorological data is received from external sources, preferably the National Climactic Data Center NEXRAD Data Inventory 14.

The system 10 may supplement the radar data 12 or NEXRAD data 14 with additional data sources 16.

Referring to FIG. 3, the system 10 processes the meteorological data in plural data channels 110 120 130. A first data channel is the hail index 110 for use in locating storm cells which have the potential to produce hail. More specifically, the preferred subset of hail index information is the probability of severe hail 110 data, which indicates the probability of severe hail within the area of representing the particular dataset. It is commonly represented by a value between zero and one hundred percent. In a first configuration, it is derived from the input meteorological data. In a second configuration, it is derived from the input meteorological data and provided by a third party. Additional information on the derivation of hail index and probability of severe hail is annexed and incorporated by reference.

A second data channel is the vertically integrated liquid 120 data, which is useful in determining the amount of precipitation that the radar detects in a vertical column of the atmosphere for an area. It is determined as known in the art. In a first configuration, it is derived from the input meteorological data. In a second configuration, it is derived from the input meteorological data and provided by a third party. Additional disclosure of vertical integrated liquid calculation is annexed and incorporated by reference.

A third data channel is the enhanced echo tops 130, which is useful in determining the peak height of an atmospheric area of precipitation. It is determined as known in the art. In a first configuration, it is derived from the input meteorological data. In a second configuration, it is derived from the input meteorological data and provided by a third party. Additional disclosure of enhanced echo tops determination is annexed and incorporated by reference.

Having the enhanced echo top 130 and the vertically integrated liquid 120 data, the system 10 calculates the vertically integrated liquid (VIL) density 140. This embodiment calculates the VIL density as known in the art. This embodiment employs the following formula:

(VIL/Echo Top)*1000 to yield a value in $g/m^3$.

An optional fourth data channel is the spatial offset 135, which is useful in determining potential spatial offset of hail position from atmospheric formation to ground level impact. The spatial offset is determined determining the hail potential for a given area. The system starts with the hail's anticipated position at at enhanced echo top above ground level. A vector is formed applying the gravitational constant from that altitude to ground level. The vector is adjusted based on storm motion and wind direction data. More specifically, vectors from fields such as radial velocity, velocity azimuth display winds, winds aloft, wind shear, and microburst activity at different altitudes between the echo top and ground level are accumulated. An offset value for ground level (or proximate ground level) is calculated and applied.

Having the VIL density and probability of severe hail data, the system 10 prepares a series of data packets to facilitate display of hail activity. In addition to the visual map data, each data packet contains hail activity overlay data. The data packets represent map data and hail activity overlay for a selected geographic area and a selected time window, each data packet representing a single visual frame of the same dimension. Each data packet contains hail activity data for the same selected geographic area. That is to say the geographic boundaries represented by each of the data packets is the same. Further, a coordinate, typically an x, y cartesian coordinate or the like, representing a pixel in one data packet corresponds to the same underlying position within the selected geographic area across the series of data packets.

Each data packet is based on meteorological data from a single time slice, with the series of data packets representing a chronologically ordered sequence of hail activity. The data packet is structured for transformation to an image showing hail activity in that time slice or subset thereof, with the series of images visually depicting the size, density, and duration of the hail activity.

As previously mentioned, the exemplary data packets include visual map data and hail activity overlay data. The hail activity overlay data is based on a derived hail index 150. In an exemplary configuration, each point or pixel in the geographic area represented by the data packet includes a derived hail index number. In the current embodiment, the derived hail index is a scaled number representing the intensity of the hail activity, indicating how the system 10 should visually represent the data packet in its transformation to an image. In one configuration, a high derived hail index indicates high hail activity. The system's 10 visual depiction of the derived hail index overlay data is configurable. For example, where a single color is used to represent derived hail index, a high derived hail index might be represented by a light color. In an alternate configuration, the system 10 might represent different ranges of the derived hail index scale with different colors. In such a configuration, the system 10 would visually display the color corresponding to the range of the computed derived hail index.

In computing the derived hail index 150, the current embodiment of the system 10 retrieves the probability of severe hail 110 data, the vertically integrated liquid 120 data, the enhanced echo tops 130 data, and VIL density 140 data for an area. The input meteorological data includes probability of severe hail 110 data. This is commonly available for an area within the selected geographic region. However, the area corresponding those input points varies depending on radar processing resolution, gaps due to radar scan intervals, and other factors. The applicable probability of severe hail 110 data of the input meteorological data is retrieved by selecting those points having a latitude & longitude within or adjacent the selected geographic region. VIL density (VILD) 140 is commonly available as clusters and is retrieved from the meteorological data in a similar manner.

As previously disclosed, the exemplary embodiment of the system 10 assigns a derived hail index 150 to each data point within the data packet corresponding to a pixel to be displayed. In one configuration, the derived hail index is a number calculated based on the product of VILD and POSH. Optionally, the derived hail index is scaled. Where a probability of severe hail 110 data is available for pixel data representing a latitude/longitude position within the selected geographic region, one configuration of the system 10 for computing the derived hail index 150 employs the following formula:

Ceiling(VILD*(POSH/2)/100+VILD,max)

where VILD is vertically integrated liquid digital density for the cluster containing the latitude/longitude position, POSH is probability of severe hail for the latitude/longitude position, and max is the configured upper end of the scale.

In some cases, probability of severe hail 110 data is unavailable for pixel data representing a latitude/longitude. In such a case, the system will substitute or calculate a suitable probability of severe hail 110 point based on proximate POSH data within a pre-configured maximum distance threshold from available data. The maximum distance threshold is determined by comparing available probability of severe hail 110 data to VIL density 140 clusters, where a suitable proximate probability of severe hail 110 point is available. On one configuration, the system 10 employs the above disclosed formula to that point adjusted by the following distance adjustment formula:

$$(A \cos(\sin(\text{posh\_lat}*PI/180)*\sin(\text{vild\_p\_lat}*PI/180)+\cos(\text{posh\_lat}*PI/180)*\cos(\text{vild\_p\_lat}*PI/180)*\cos((\text{posh\_lon}-\text{vild}p\_p\_\text{lon})*PI/180))*180/PI)*60*1.1515)$$

where posh_lat is the latitude of the proximate probability of severe hail point, vild_p_lat is the latitude for the proximate VIL density cluster, posh_lon is the longitude of the proximate probability of severe hail point, vild_p_lon is the longitude for the proximate VIL density cluster.

The process of forming the data packets 100 110 120 130 140 150 is repeated with chronologically subsequent time slices of the meteorological data to form the series of data packets. The data packets are stored for retrieval. In one configuration, a data packet is transformed to an image for transmittal to a display 24. In the exemplary configuration, each of the data packets in the series is transformed into a composite animated sequence image for transmission to a display 24, illustrating the hail intensity within the selected region and time window. It would be understood by those skilled in the meteorological data processing art that the system 10 and corresponding methods of processing and displaying meteorological data may be disseminated in a variety of ways. The data packets or images may be provided and encoded for the recipients to receive by internet, radio, television, or other media.

Figure 5A:
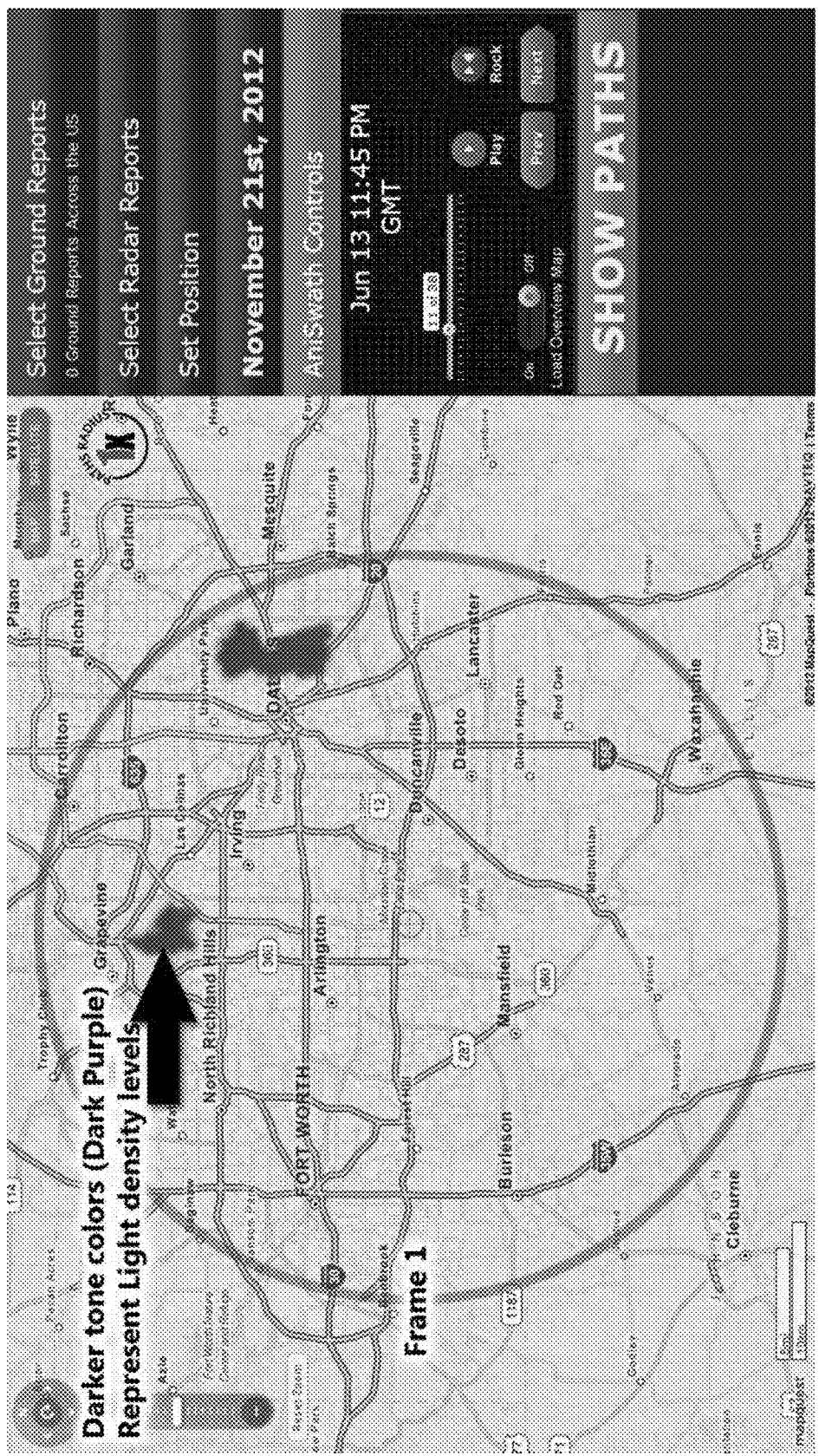
FIG. 5A depicts a representative early visual frame of a series in light hail intensity conditions.
Figure 5B:
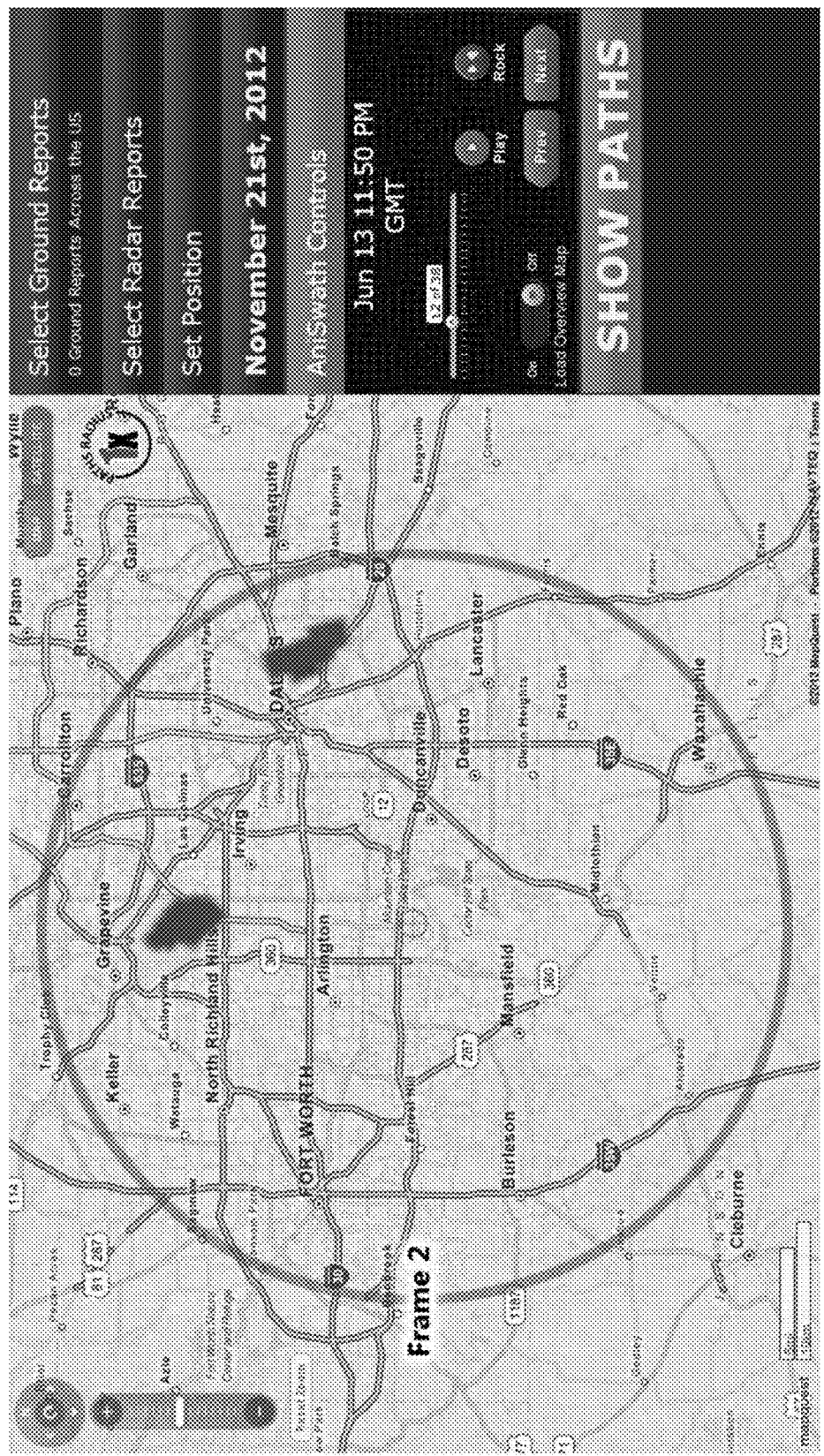
FIG. 5B depicts a representative middle visual frame of a series in light hail intensity conditions.
Figure 5C:
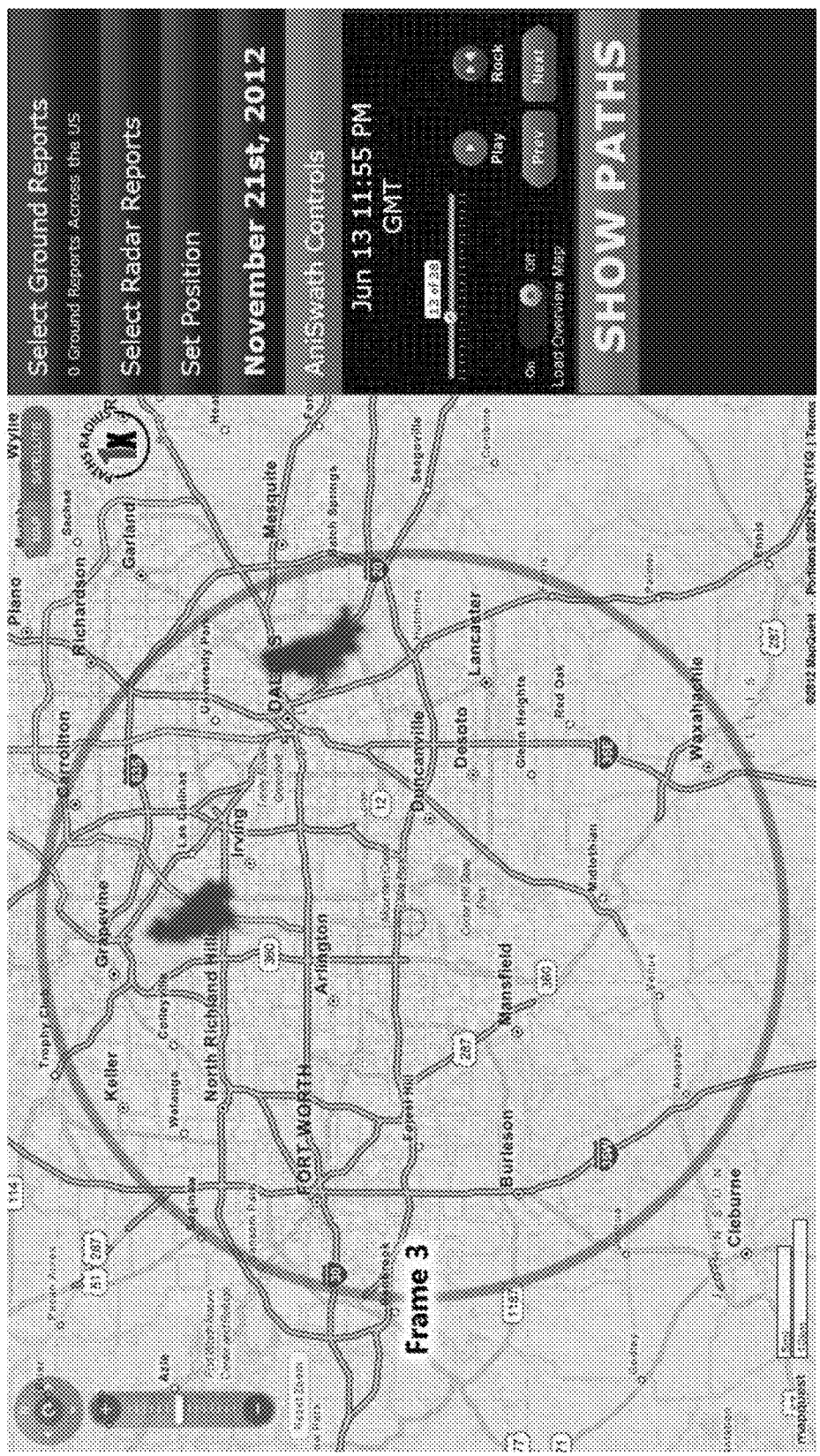
FIG. 5C depicts a representative later visual frame of a series in light hail intensity conditions.
Figure 6A:
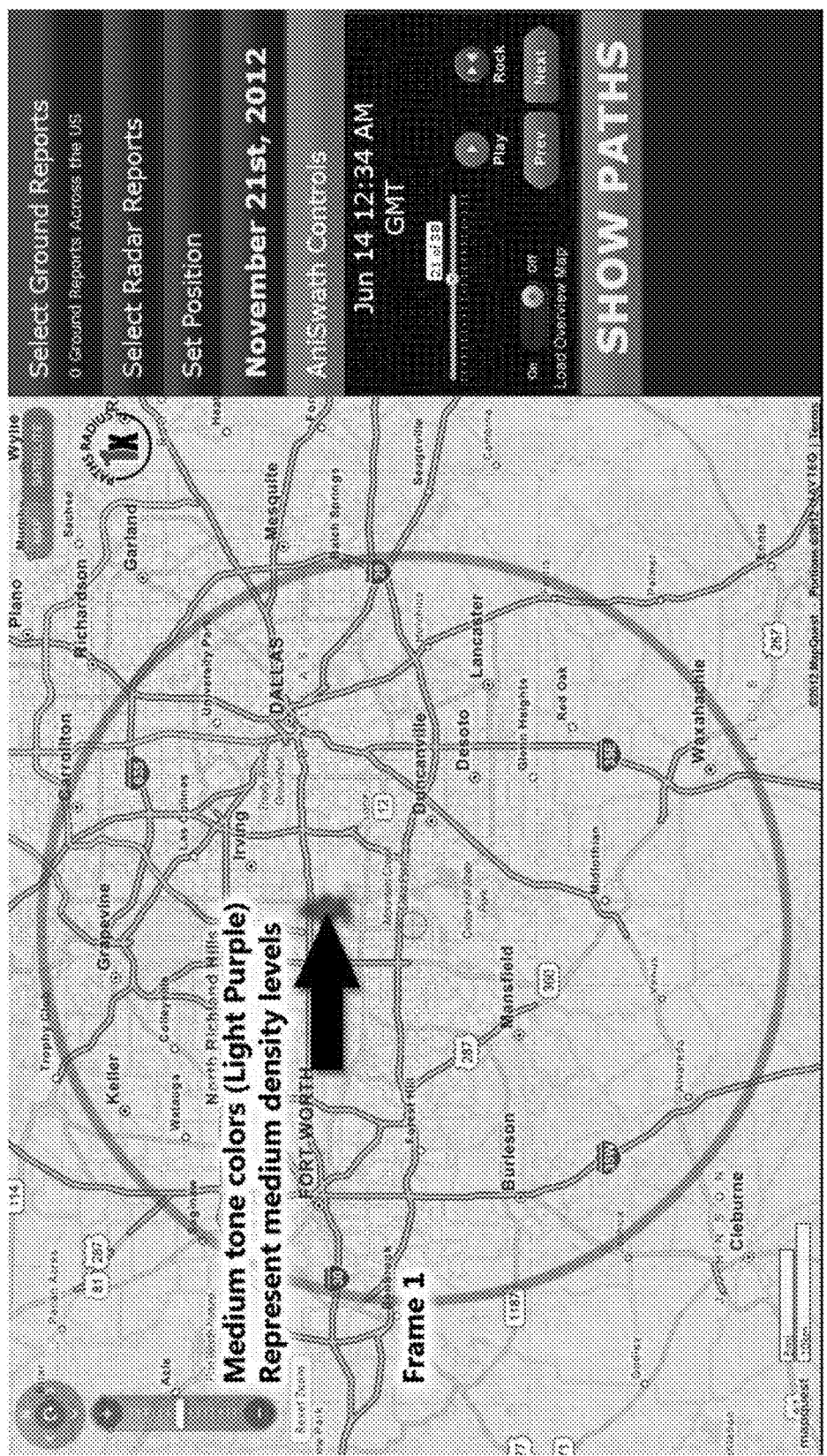
FIG. 6A depicts a representative early visual frame of a series in moderate hail intensity conditions.
Figure 6B:
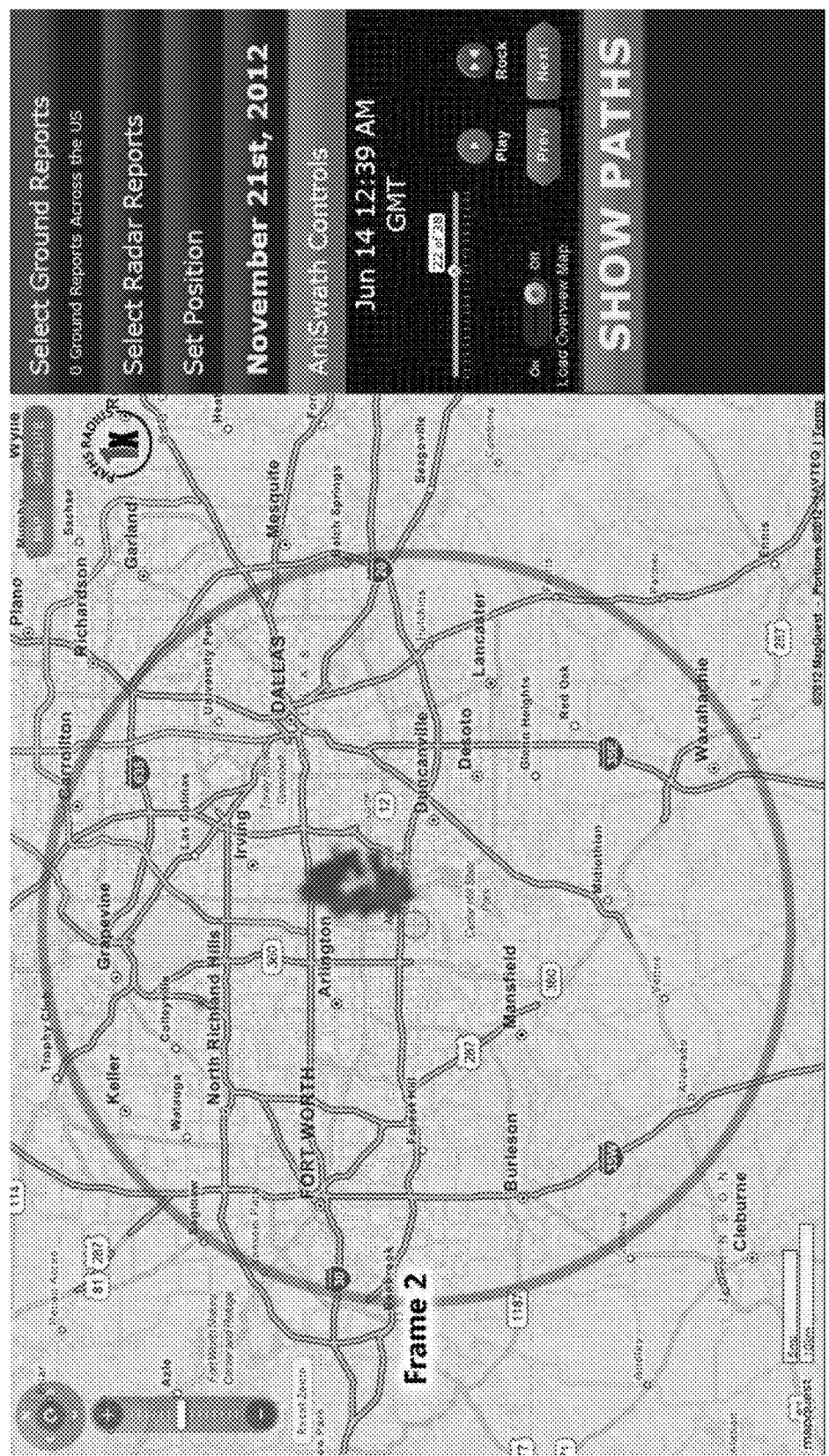
FIG. 6B depicts a representative middle visual frame of a series in moderate hail intensity conditions.
Figure 6C:
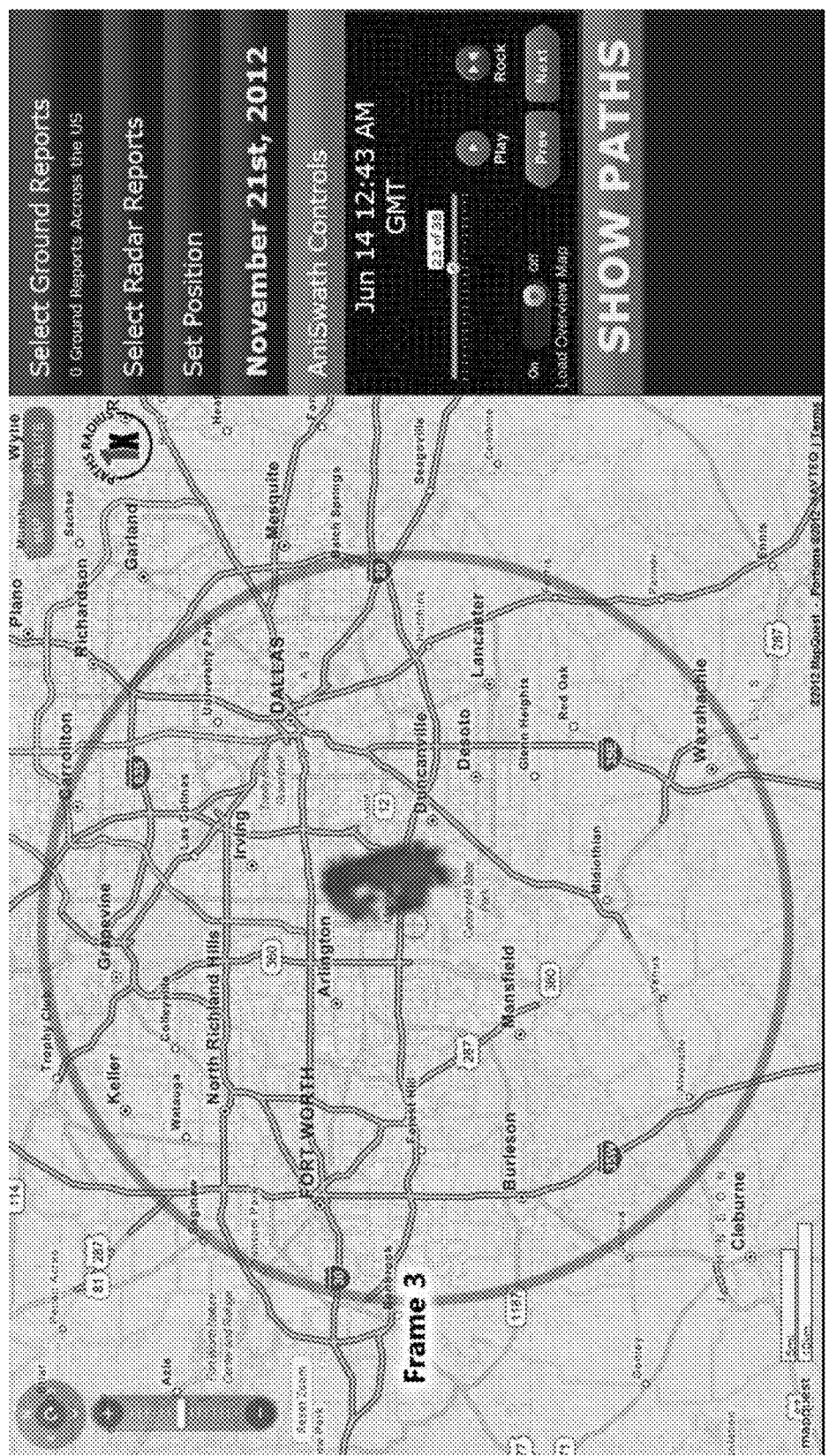
FIG. 6C depicts a representative later visual frame of a series in moderate hail intensity conditions.
Figure 7A:
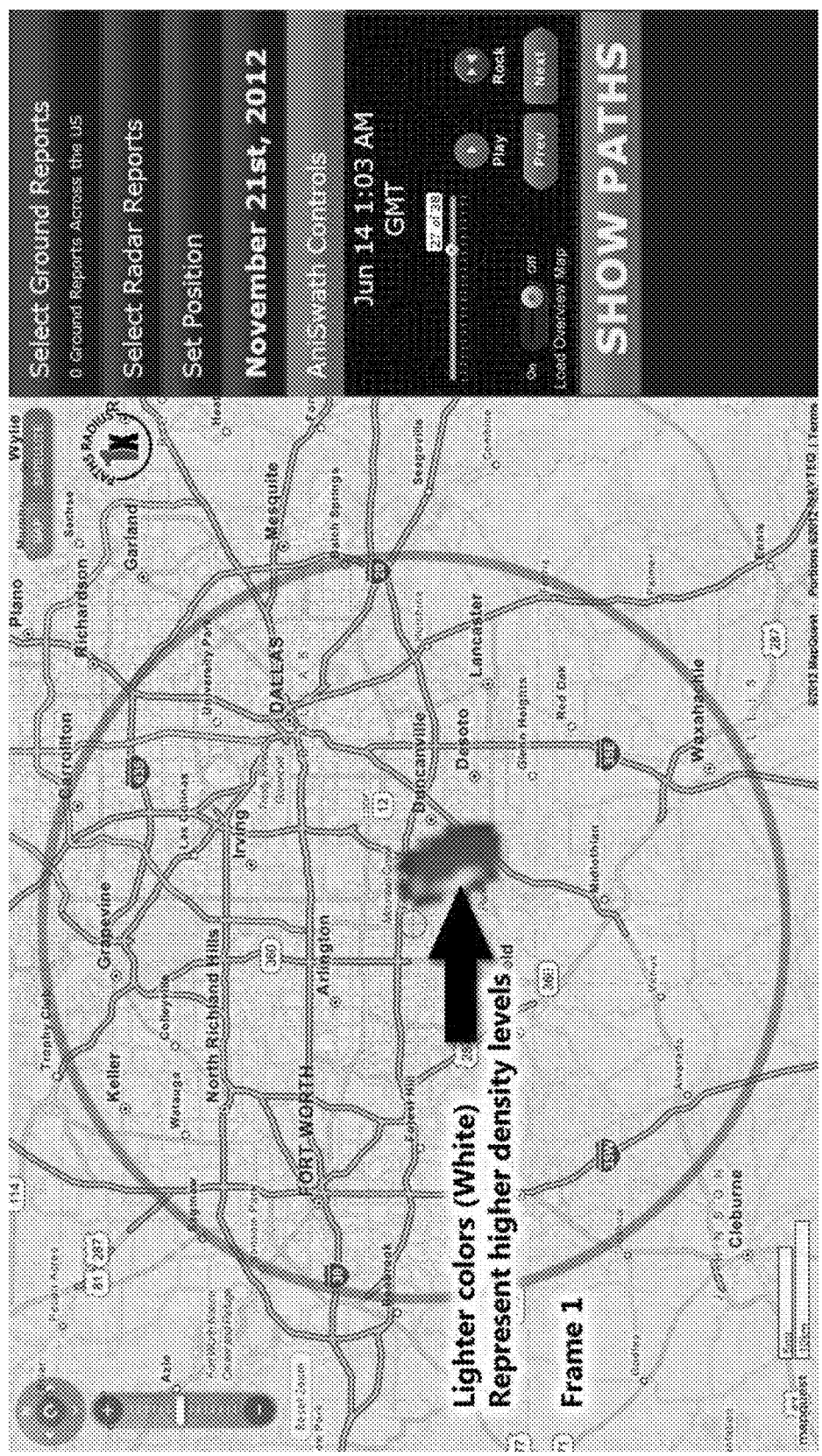
FIG. 7A depicts a representative early visual frame of a series in severe hail intensity conditions.
Figure 7B:
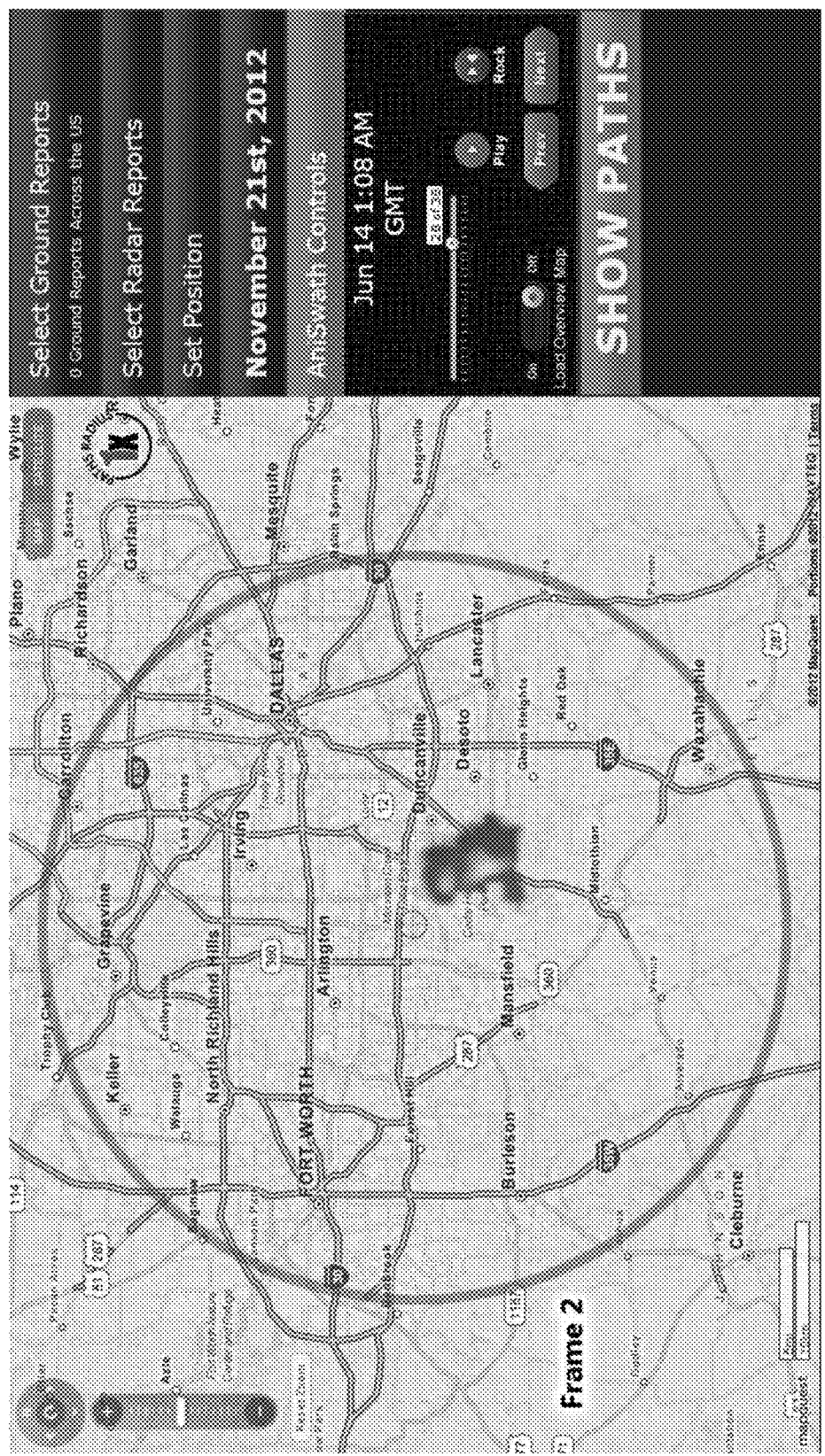
FIG. 7B depicts a representative middle visual frame of a series in severe hail intensity conditions.
Figure 7C:
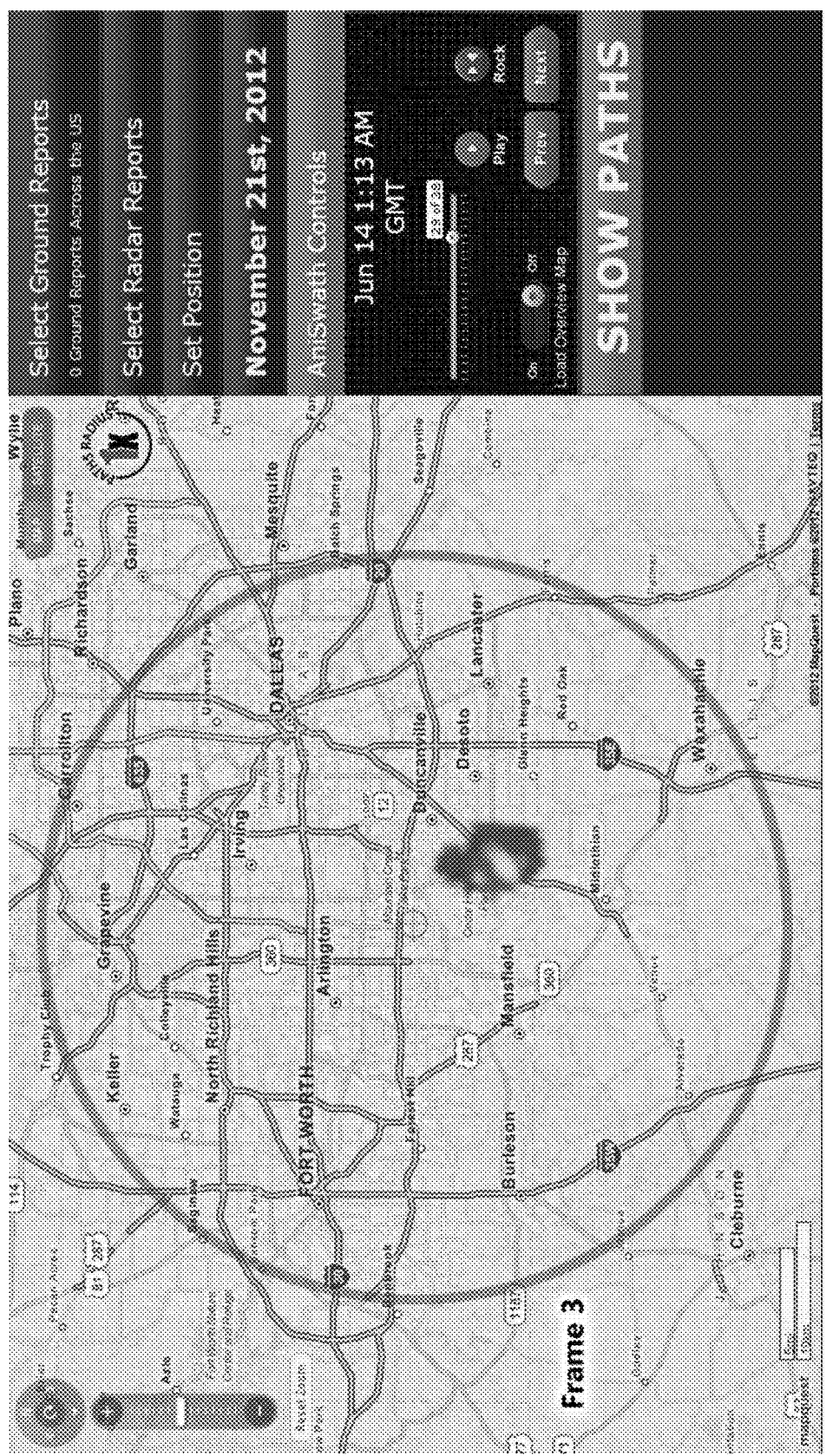
FIG. 7C depicts a representative later visual frame of a series in severe hail intensity conditions.

FIGS. 5A-C display early, middle, and later resultant images within an animation sequence transformed from data packets representing light hail activity. FIGS. 6A-C display early, middle, and later resultant images within an animation sequence transformed from data packets representing moderate hail activity. FIGS. 7A-C display early, middle, and later resultant images within an animation series transformed from data packets representing severe hail activity.

Figure 8:
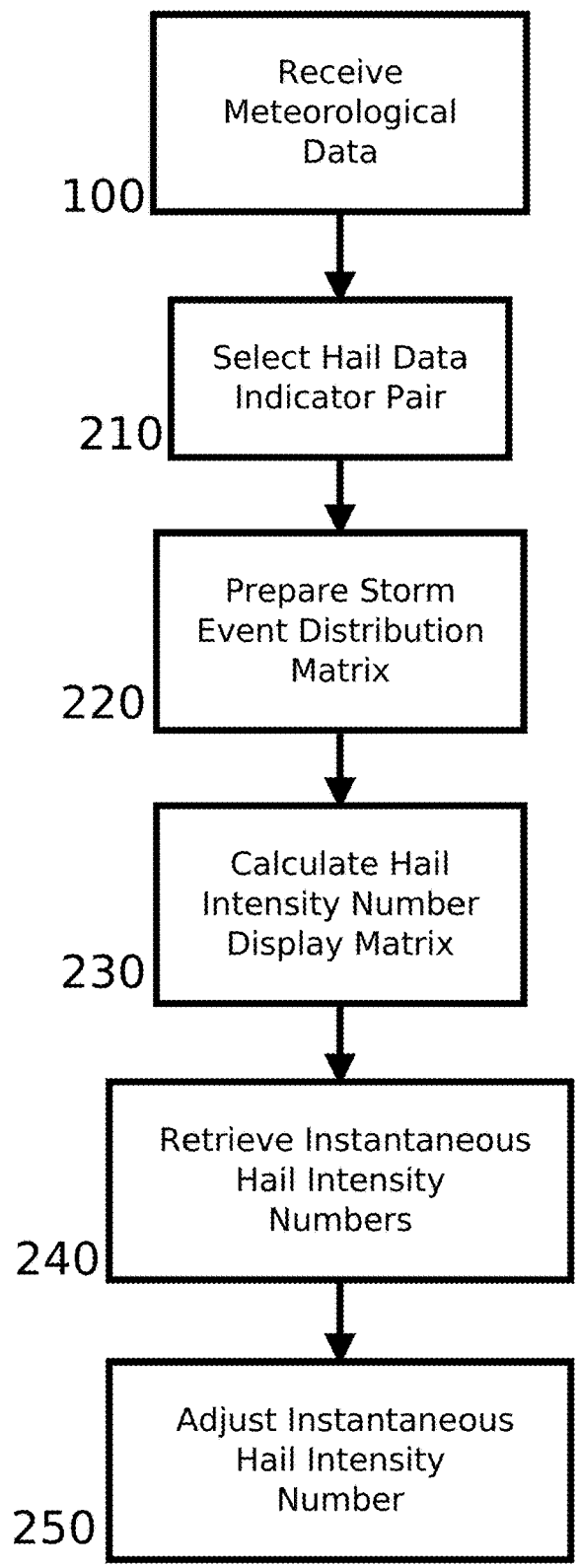
FIG. 8 depicts a flowchart of an alternate subset of the process of FIG. 1.

In an alternate embodiment, a hail intensity display number is employed as a basis to generate packets for display 70. FIG. 8 displays a subprocess of generating data packets according to the current embodiment. The exemplary data packets include visual map data and hail activity overlay data. The hail activity overlay data is based on a hail intensity display number. In an exemplary configuration, each point or pixel in the geographic area represented by the data packet includes a hail intensity display number. In the current embodiment, the hail intensity display number is a number representing the intensity of the hail activity, indicating how the system 10 should visually represent the data packet in its transformation to an image. In one configuration, a hail intensity display number indicates high hail activity. The system's 10 visual depiction of the hail intensity display number overlay data is configurable. For example, where a single color is used to represent hail intensity display, a high hail intensity display number might be represented by a light color. In an alternate configuration, the system 10 might represent different ranges of the hail intensity display number with different colors. In such a configuration, the system 10 would visually display the color corresponding to the range of the computed hail intensity display number.

As depicted in FIG. 8, major steps within this embodiment include receiving meteorological data 100. A hail data indicator pair is selected 210. A storm event distribution matrix is prepared based on the hail data indicator pair 220. A hail intensity number display matrix is calculated based on the storm event distribution matrix 230. Using the hail intensity number display matrix, localized hail intensity display numbers are retrieved 240. More consideration will be given to each of the steps further below.

The system 10 receives meteorological data 100. As previously disclosed, the meteorological data sources 12 13 14 16, directly or indirectly, and without exclusion, can include data products such as rainfall intensity, reflectivity, composite reflectivity, clear air mode, precipitation mode, echo tops, vertical integrated liquid, surface rainfall accumulation, radial velocity, velocity azimuth display winds, winds aloft, wind shear, microburst activity, and the like. FIG. 4 shows a representative partial database schema for processing by the system 10. Again, it includes series of rows or "slices" having a timestamp for a particular set of data, a latitude and latitude, water particle size, number of water particles, the height of those water particles, and the probability of severe hail. It is to be understood that the input meteorological data can be pre-processed prior to input to the system 10 or post-processed for use by the system 10. In exemplary configuration, meteorological data for a storm event in the storm region is received for processing. A storm event can include data for the entire life cycle of the storm, a time slice of the storm, a phase of the storm, or other slices.

At step 210, a hail data indicator pair is selected for further processing and display basis. More specifically, and as a basis for generation of the hail intensity display number, a first hail data indicator and a second hail data indicator are selected. Suitable hail data indicators include those which directly or indirectly indicate hail activity. Representative hail data indicators include probability of severe hail, vertically integrated liquid density, maximum size, ground truth, lowest level radar, and other hail data indicators. A hail data indicator pair of a first hail data indicator and a second hail data are selected. In certain configurations, the first hail data indicator is probability of severe hail and the second hail data indicator is vertically integrated liquid density. In certain configurations, the first hail data indicator is probability of severe hail and the second hail data indicator is maximum hail size. In certain configurations, the first hail data indicator is probability of severe hail and the second hail data indicator is lowest level radar returns. Other configurations include other hail data indicator pairings. In certain configurations, multiple hail data indicator pairings can be employed. For example, in a first pairing can include the first hail data indicator of probability of severe hail and the second hail data indicator as maximum hail size. The corresponding second pairing can include the first hail data indicator of probability of severe hail and the second hail data indicator as ground truth hail size.

Figure 9A:
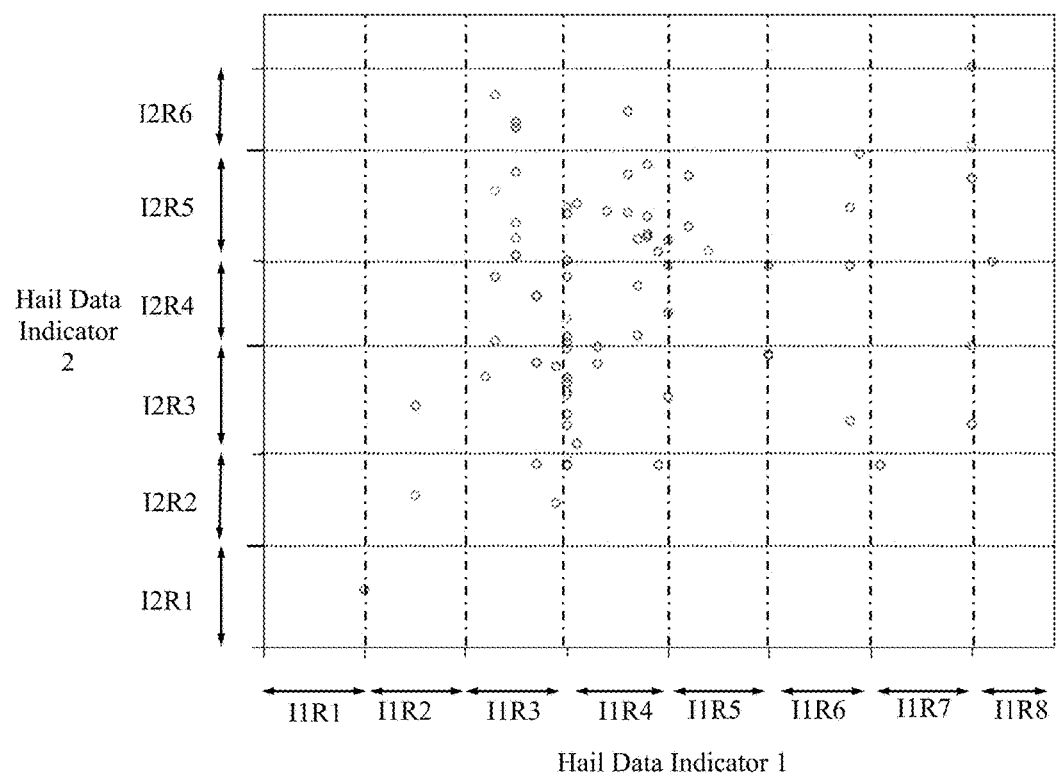
FIGS. 9A-9C depict distributions of data in given hail data indicator pairs, segmented in ranges.
Figure 9B:
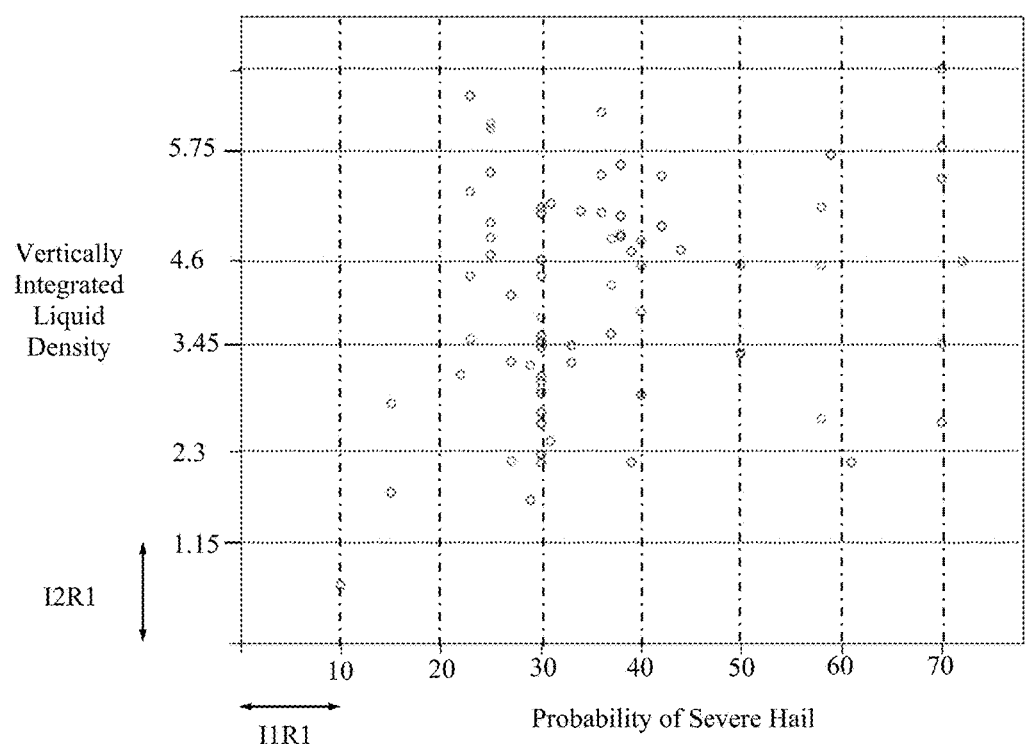
Figure 9C:
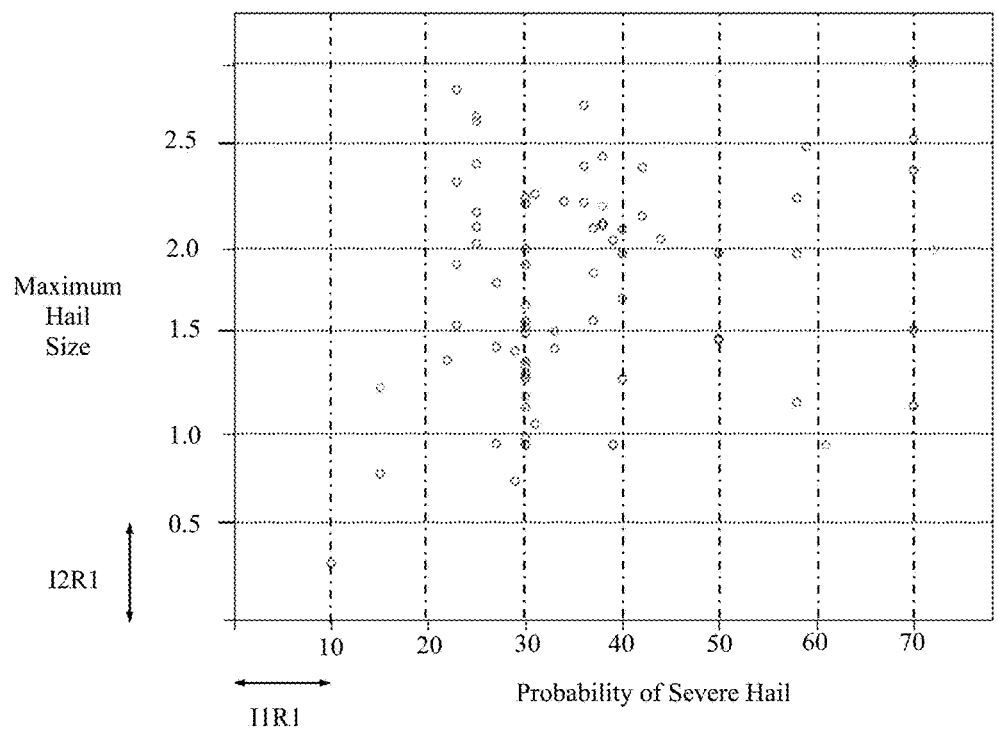

At step 220, a storm event distribution is prepared using the configured hail data indicator pair for the storm event data. In certain configurations, a storm event distribution is prepared using on the configured hail data indicator pair for the storm event data. Representative distributions are shown in FIGS. 9A-9C. Ranges are selected for each of the hail data indicators. The selected width of a range is selected towards a target resolution. Illustrated are six range scales on the x axis and eight range scales on the y axis. It is within the scope of this invention to employ various ranges in order to produce varying resolutions, which will be appreciated in the further explanation below.

For example, FIG. 9A illustrates a distribution chart showing the first hail data indicator on the x axis and further divided into ranges (denoted as Indicator 1 Range 1, I1R1, I1R2, I1R3, I1R4, and so on). It further illustrates the second hail data indicator on the y axis and further divided into ranges (denoted as Indicator 2 Range 1, I2R1, I2R2, I2R3, I2R4, and so on). To illustrate, FIG. 9B illustrates a distribution chart showing the first hail data indicator as probability of severe hail on the x axis and further divided into ranges of 10% intervals, that is to say 0-10, 11-20, 21-30, and so on. It further illustrates the second hail data indicator as vertically integrated liquid density on the y axis and further divided into ranges of 0-1.15, 1.15-2.3, 2.3-3.45, and so on. Similarly, FIG. 9C illustrates a distribution chart showing the first hail data indicator as probability of severe hail on the x axis and the second hail data indicator as maximum hail size on the y axis.

In further preparation of the storm event distribution data, the number of occurrences within respective ranges is employed by the system. As will be appreciated from FIGS. 9A-9C, a number of occurrences of data points from the storm event data within each of the ranges of the first hail data indicator will be observed in each of the ranges of the second hail data indicator. The system calculates the number of occurrences within respective ranges. FIG. 10A shows a distribution table with the number of occurrences within the respective ranges. A distribution number is shown for the number of occurrences within the respective range pairs (shown as O1, O2, O3, . . . ). FIG. 10B shows a distribution table with the number of occurrences within the respective ranges. To illustrate using the first range of probability of severe hail (0-10%) and the first range of vertically integrated liquid density (0-1.14), the value is 1845, indicating the system tabulated 1845 data points across the storm event data where the data point is within that POSH range and that VILD range.

In further preparation of the storm event distribution data, the proportion of occurrences within a respective range is calculated by the system, as shown in FIG. 11A. To illustrate, within a given range of the first hail indicator data, the proportion of occurrences for a given range of the second hail indicator data of the total occurrences second hail indicator data within that first hail indicator data range is calculated. FIG. 10B illustrates the number of occurrences of ranges of vertically integrated liquid density within the probability of severe hail range of 0-10%, while FIG. 11B illustrates the calculated proportion of occurrences. For example, 69% (0.69127) of the 0-10% POSH points occurred with values of VILD between 0 and 1.15, an additional 23% (0.234545) occurred between 1.15 and 2.3, and so on.

At step 230, the hail intensity number display matrix is generated. For each of the second hail data indicator ranges, a hail intensity number is calculated to generate the hail intensity number display matrix. A summation of two or more of the proportional occurrences of the second hail data indicator over the first hail data indicator ranges yields a hail intensity number display for its range. For example, in certain configurations, the summation may only include higher probability POSH ranges. In certain configurations, a range value multiplier is applied to the proportional occurrences. One employed range multiplier is a value within the second hail data indicator range. In certain configurations, the range multiplier value is the upper end of the second hail data indicator range. FIG. 12A shows a summation of the proportional occurrences of the second hail data indicator over the first hail data indicator ranges, with a range multiplier value (RV) applied to yield hail intensity number display matrix values. FIG. 12B shows a summation of the proportional occurrences of the second hail data indicator over the first hail data indicator ranges, with the range multiplier value (RV) of the upper end of the POSH range applied to yield the hail intensity number display matrix values. Specifically illustrated is (0.69127*10)+(0.130435*20)+(0.033113*30)+
(0.037594*40)+(0.020408*50)+(0*60)+
(0.025316*70)+(0*80)+(0*90)+(0*100)

The above yields a hail intensity number of 14.81107 for the VILD range of 0-1.14. The process is repeated to calculate the remaining values of the hail intensity number display matrix. FIGS. 13A and 13B illustrate hail intensity number display matrices.

At step 240, instantaneous hail intensity display numbers are retrieved for particular points, typically corresponding to a latitude/longitude, within the data packet to be displayed 70. As previously disclosed, the exemplary embodiment of the system 10 assigns a hail intensity display number to each data point within the data packet corresponding to a pixel to be displayed. For the time of the subject data packet, the instantaneous second hail data indicator value is retrieved from the meteorological data of the corresponding time period and geographic location. The retrieved instantaneous second hail data indicator value is used to retrieve the corresponding hail intensity display number from the hail intensity number display matrix. More particularly, the hail intensity number display of the range of the retrieved instantaneous second hail data indicator value is retrieved from the hail intensity number display matrix. For example, the second hail data indicator of FIG. 9B is the vertically integrated liquid density. In such a pairing, the system retrieves the instantaneous vertically integrated liquid density and retrieves the corresponding hail intensity display number from a hail intensity display number matrix such as that of FIG. 13B. For example, the second hail data indicator of FIG. 9C is the maximum hail size. In such a pairing, the system retrieves the instantaneous maximum hail size and retrieves the corresponding hail intensity display number from the hail intensity display number matrix.

Figure 14B:
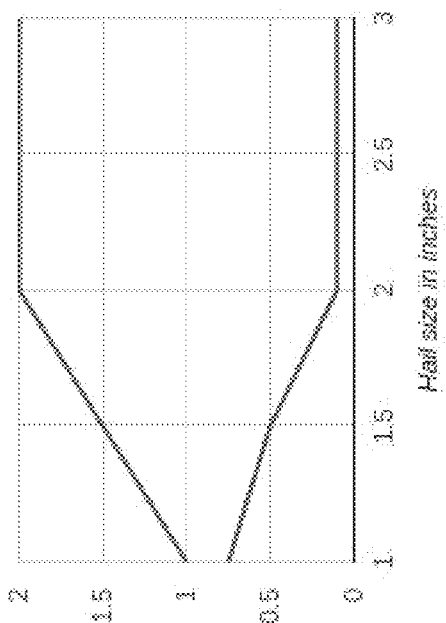
FIGS. 14A and 14B depict hail intensity display numbers adjustments.
Figure 14A:
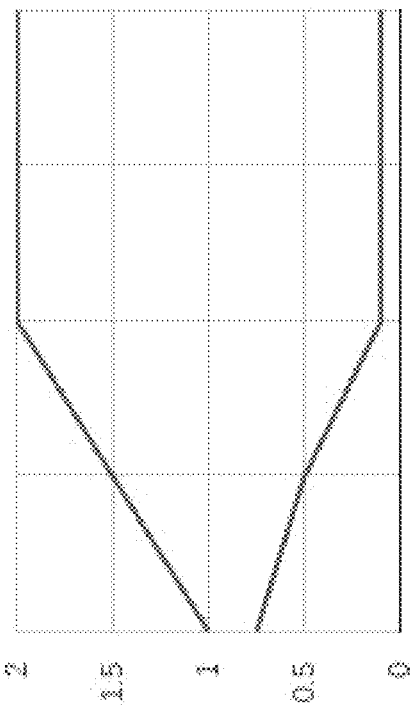

In certain configurations, the system applies a weighting factor to the retrieved hail intensity display number 250. FIGS. 14A and 14B illustrate a scaling factor. The illustrated scaling factor is a multiplier ranging from zero to two. The scaling factor is applied according to a user input selectable weighting. The user input scaling factor is applied to the hail intensity display numbers.

Figure 15A:
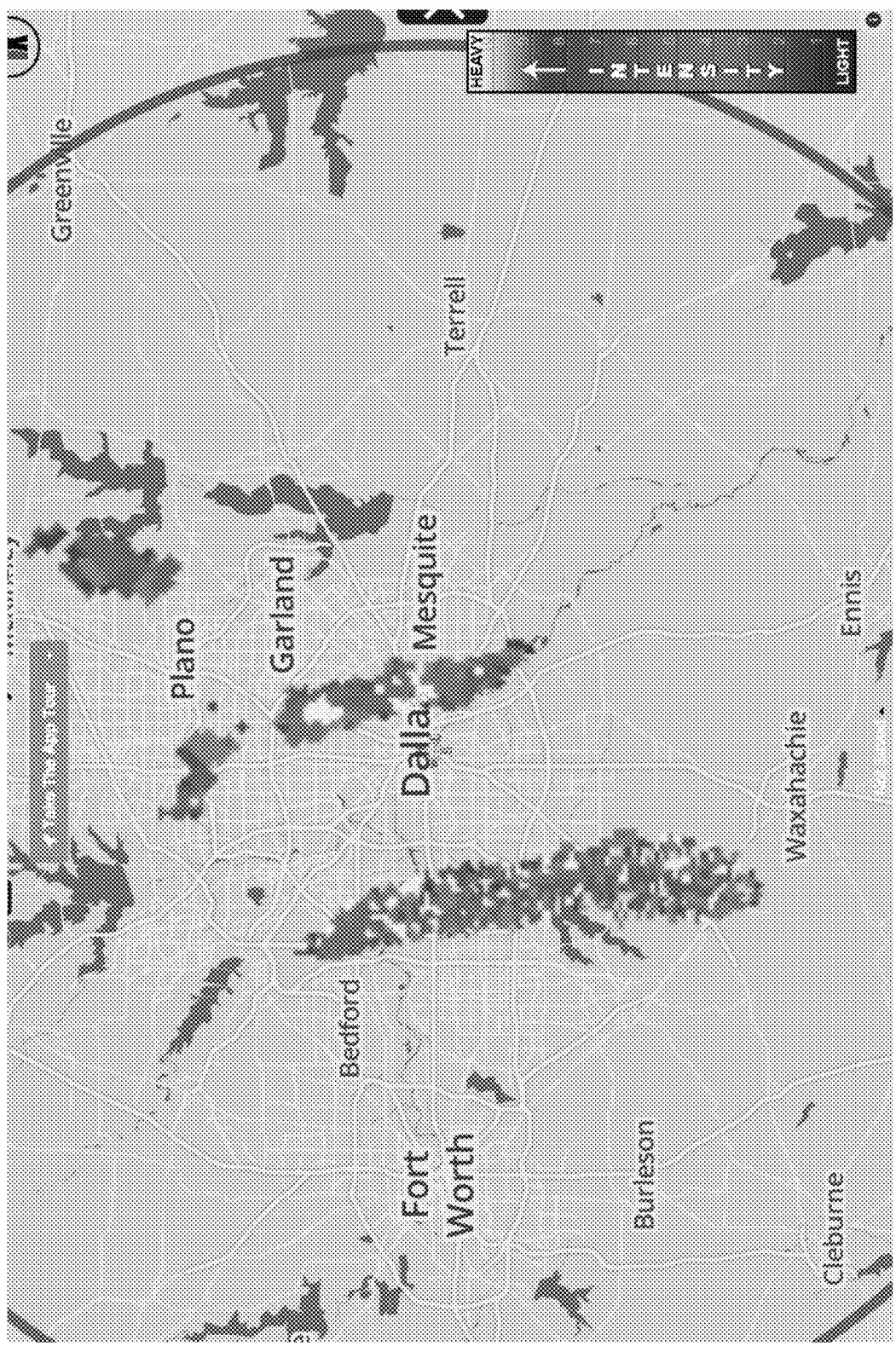
FIGS. 15A-15C depict visual representation of frames of hail intensity conditions.
Figure 15B:
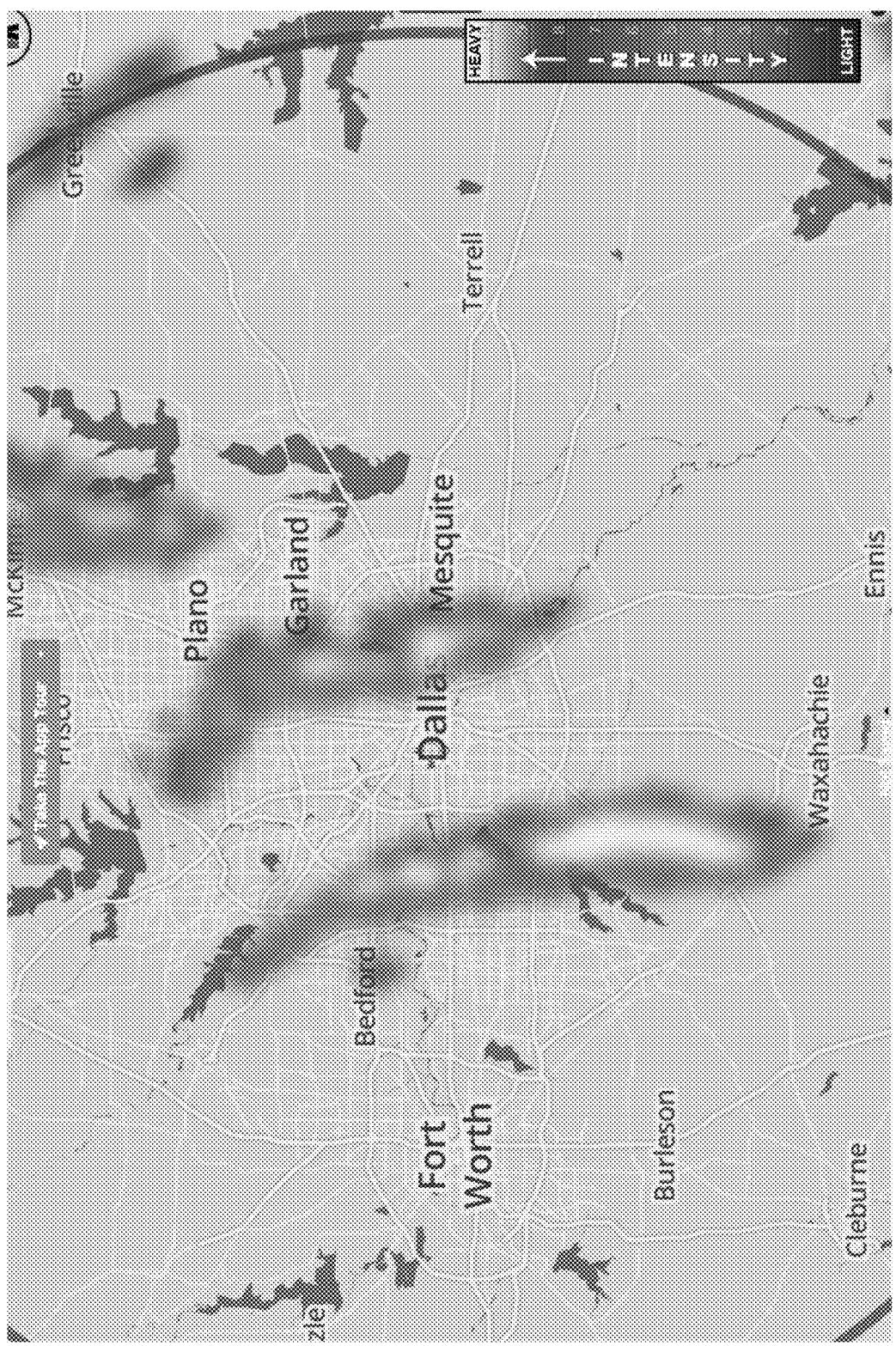
Figure 15C:
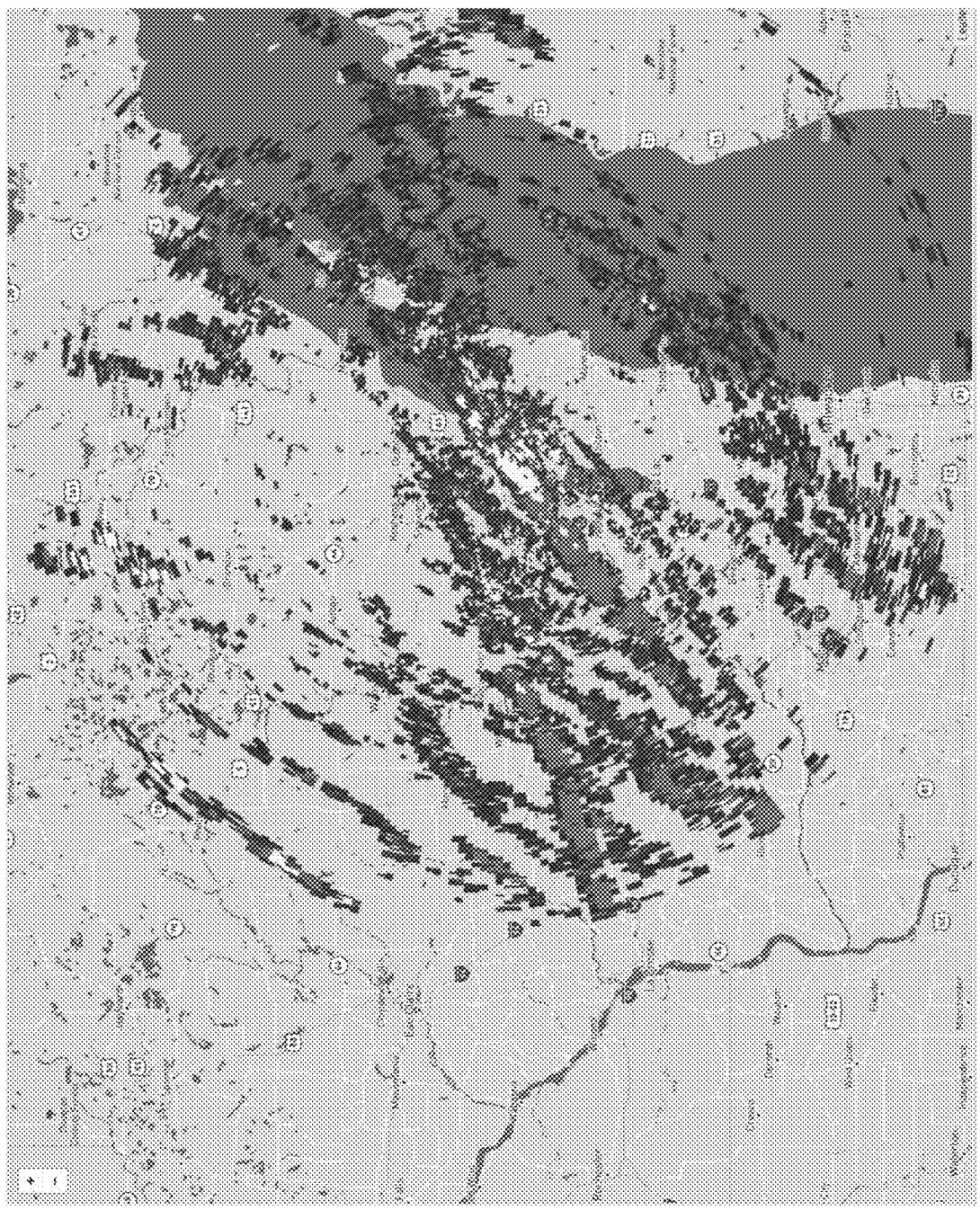

Again, the process of forming the data packets 100 210 220 230 240 can be repeated with chronologically subsequent time slices of the meteorological data to form a series of data packets. The data packets are stored for retrieval. In one configuration, a data packet is transformed to an image for transmittal to a display 24. In the exemplary configuration, each of the data packets in the series is transformed into a composite animated sequence image for transmission to a display 24, illustrating the hail intensity within the selected region and time window. FIGS. 15A-C display images resulting transformed from data packets representing hail activity display numbers of the current embodiment.

Insofar as the description above, and the accompanying drawing disclose any additional subject matter that is not within the scope of the single claim below, the inventions are not dedicated to the public and the right to file one or more applications to claim such additional inventions is reserved.

What is claimed is:
1. A method of processing weather data for display comprising:
   providing a processor and memory configured to perform the following steps
      receiving a meteorological data corresponding to a geographic region from at least one meteorological data source for a storm event;

processing a hail data indicator pair comprising a first hail data indicator and a second hail data indicator, said hail data indicators being meteorological data which directly or indirectly indicates hail activity;

a storm event distribution generated using said hail data indicator pair comprising the steps of:

configuring ranges for each of said hail data indicators, tabulating the number of occurrences of data points from the storm event data within the intersecting ranges of said first hail data indicator and said second hail data indicator, and calculating the proportion of occurrences within said intersecting ranges;

a hail intensity number display matrix is calculated using said storm event distribution comprising the steps of:

for each of the second hail data indicator ranges, generating a summation of at least two of the proportional occurrences of the second hail data indicator over the first hail data indicator ranges, yielding a hail intensity number display for the respective range;

retrieving the instantaneous second hail data indicator value from the meteorological data of the corresponding time period and geographic location, further retrieving the hail intensity display number from said hail intensity number display matrix using said instantaneous second hail data indicator value; and generating a data packet of said hail intensity display numbers, each of said hail intensity display numbers corresponding to a local geographic point.

2. The method of claim 1, wherein said hail data indicators are selected from probability of severe hail, vertically integrated liquid density, maximum size, ground truth, and lowest level radar.

3. The method of claim 1, wherein said hail data indicator pair comprises a first hail data indicator of probability of severe hail and a second hail data indicator of vertically integrated liquid density.

4. The method of claim 1, wherein said hail data indicator pair comprises a first hail data indicator of probability of severe hail and a second hail data indicator of maximum hail size.

5. The method of claim 1, wherein said hail data indicator pair comprises a first hail data indicator of probability of severe hail and a second hail data indicator of lowest level radar returns.

6. The method of claim 1, wherein a range value multiplier is applied to the proportional occurrences.

7. The method of claim 6, further comprising transforming said data packet into a graphical image format.

8. The method of claim 7, further comprising visual map data corresponding to the geographic points of said hail intensity display numbers.

9. The method of claim 1, further comprising generating a second data packet from meteorological data source for subsequent selected time slice.

10. The method of claim 1, further comprising generating a second data packet from said meteorological data source for a subsequent selected time slice, transforming said data packets into a graphical image format, said graphical format comprising an ordered image sequence of said first data packet followed by said second data packet.

11. A method of processing weather data for display comprising:

providing a processor and memory configured to perform the following steps receiving a meteorological data corresponding to a geographic region from at least one meteorological data source for a storm event;

processing a hail data indicator pair comprising a first hail data indicator of vertically integrated liquid density and a second hail data indicator of probability of severe hail;

a storm event distribution generated using said hail data indicator pair comprising the steps of:

configuring ranges for each of said hail data indicators, tabulating the number of occurrences of data points from the storm event data within the intersecting ranges of said first hail data indicator and said second hail data indicator, and calculating the proportion of occurrences within said intersecting ranges;

a hail intensity number display matrix is calculated using said storm event distribution comprising the steps of:

for each of the second hail data indicator ranges, generating a summation of at least two of the proportional occurrences of the second hail data indicator over the first hail data indicator ranges, yielding a hail intensity number display for the respective range;

retrieving the instantaneous second hail data indicator value from the meteorological data of the corresponding time period and geographic location, further retrieving the hail intensity display number from said hail intensity number display matrix using said instantaneous second hail data indicator value; and generating a data packet of said hail intensity display numbers, each of said hail intensity display numbers corresponding to a local geographic point.

12. The method of claim 11, wherein a range value multiplier is applied to the proportional occurrences.

13. The method of claim 12, wherein said range value multiplier is a value within the second hail data indicator range.

14. The method of claim 12, wherein said range value multiplier is the upper end of the second hail data indicator range.

15. A system of processing weather data for display comprising:

a processor and memory configured to perform the following steps:

receiving a meteorological data corresponding to a geographic region from at least one meteorological data source for a storm event;

processing a hail data indicator pair comprising a first hail data indicator and a second hail data indicator, said hail data indicators being meteorological data which directly or indirectly indicates hail activity;

a storm event distribution generated using said hail data indicator pair comprising the steps of:

configuring ranges for each of said hail data indicators, tabulating the number of occurrences of data points from the storm event data within the intersecting ranges of said first hail data indicator and said second hail data indicator, and calculating the proportion of occurrences within said intersecting ranges;

a hail intensity number display matrix is calculated using said storm event distribution comprising the steps of:

for each of the second hail data indicator ranges, generating a summation of at least two of the proportional occurrences of the second hail data indicator over the first hail data indicator ranges, yielding a hail intensity number display for the respective range;

retrieving the instantaneous second hail data indicator value from the meteorological data of the corresponding time period and geographic location, further retrieving the hail intensity display number from said hail intensity number display matrix using said instantaneous second hail data indicator value; and generating a data packet of said hail intensity display numbers, each of said hail intensity display numbers corresponding to a local geographic point.

16. The system of claim 15, wherein said hail data indicator pair comprises a first hail data indicator of probability of severe hail and a second hail data indicator of vertically integrated liquid density.

17. The system of claim 15, further comprising transforming said data packet into a graphical image format.

18. The system of claim 17, further comprising visual map data corresponding to the geographic points of said hail intensity display numbers.

19. The system of claim 15, further comprising generating a second data packet from meteorological data source for subsequent selected time slice.

20. The system of claim 15, further comprising generating a second data packet from said meteorological data source for a subsequent selected time slice, transforming said data packets into a graphical image format, said graphical format comprising an ordered image sequence of said first data packet followed by said second data packet.

* * * * *